(12) United States Patent
Deo et al.

(10) Patent No.: US 10,787,390 B2
(45) Date of Patent: Sep. 29, 2020

(54) AERATED COMPOSITE MATERIALS, METHODS OF PRODUCTION AND USES THEREOF

(71) Applicant: Solidia Technologies, Inc., Piscataway, NJ (US)

(72) Inventors: Omkar Deo, Piscataway, NJ (US); David Vuong, Piscataway, NJ (US); Deepak Ravikumar, Piscataway, NJ (US); Sadananda Sahu, Cleveland, OH (US); Vahit Atakan, West Windsor, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 326 days.

(21) Appl. No.: 15/972,760

(22) Filed: May 7, 2018

(65) Prior Publication Data
US 2019/0039955 A1    Feb. 7, 2019

Related U.S. Application Data

(63) Continuation of application No. 14/463,901, filed on Aug. 20, 2014, now Pat. No. 9,963,392.

(60) Provisional application No. 61/868,155, filed on Aug. 21, 2013.

(51) Int. Cl.
*C04B 28/18*    (2006.01)

(52) U.S. Cl.
CPC ........ *C04B 28/188* (2013.01); *C04B 2201/50* (2013.01); *Y02P 40/18* (2015.11); *Y02W 30/92* (2015.05); *Y02W 30/94* (2015.05); *Y10T 428/249968* (2015.04)

(58) Field of Classification Search
None
See application file for complete search history.

(56) References Cited

U.S. PATENT DOCUMENTS

| | | | | |
|---|---|---|---|---|
| 7,771,684 B2* | 8/2010 | Constantz | ............... | C04B 22/10 |
| | | | | 106/713 |
| 9,878,951 B2* | 1/2018 | McCandlish | ........... | C04B 28/10 |
| 9,963,392 B2* | 5/2018 | Deo | ...................... | B28B 11/245 |
| 2011/0182799 A1* | 7/2011 | Riman | ............... | B01D 53/1456 |
| | | | | 423/396 |
| 2014/0272216 A1* | 9/2014 | Deo | ...................... | C04B 40/024 |
| | | | | 428/34.5 |
| 2016/0340261 A1* | 11/2016 | Atakan | ................. | C04B 40/024 |

FOREIGN PATENT DOCUMENTS

| | | |
|---|---|---|
| CN | 1764521 A | 4/2006 |
| CN | 101910086 A | 12/2010 |
| WO | 2004071734 A2 | 8/2004 |
| WO | 2009102360 A2 | 8/2009 |
| WO | 2012/122031 A2 | 9/2012 |
| WO | 2014/165252 A1 | 10/2014 |

* cited by examiner

*Primary Examiner* — Benjamin A Schiffman
(74) *Attorney, Agent, or Firm* — Dentons US LLP

(57) ABSTRACT

The invention provides novel aerated composite materials that possess excellent physical and performance characteristics of aerated concretes, and methods of production and uses thereof. These composite materials can be readily produced from widely available, low cost raw materials by a process suitable for large-scale production with improved energy consumption, desirable carbon footprint and minimal environmental impact.

22 Claims, 15 Drawing Sheets

AERATED COMPOSITE MATERIALS, METHODS OF PRODUCTION AND USES THEREOF

PRIORITY CLAIMS AND RELATED PATENT APPLICATIONS

This application is continuation application of and claims priority to U.S. patent application Ser. No. 14/463,901, filed Aug. 20, 2014, which claims benefit of provisional Application No. 61/868,155 filed on Aug. 21, 2013, the contents of which are incorporated by reference in their entirety for all purposes as if fully set forth below.

FIELD OF THE INVENTION

The invention generally relates to aerated composite materials and aerated concretes. More particularly, the invention relates to novel aerated composite materials, and formulations and methods for their manufacture and uses. These aerated composite materials are suitable for a variety of applications in construction, fire resistance and insulation, landscaping, and infrastructure.

BACKGROUND OF THE INVENTION

Autoclaved aerated concrete is a type of lightweight, precast concrete that is formed under high temperatures and pressures using raw materials such as cement, fine aggregates such as sand or other filler materials, lime, water, and an aerating agent. The aerating agent causes air voids to form in the matrix and increase the porosity of the material, which is accompanied by an increase in the volume of the material along with a reduction in density.

Aerated concrete products offer a number of advantages over conventional concretes including their good strength, low weight, resistance to fire, corrosion, termite and mold, as well as good thermal insulation and sound deadening properties. Due to its lightweight and dimensional accuracy, aerated concretes can be assembled with minimal waste thereby reducing the need for additional equipment in construction and assembling. They offer high durability and require minimum maintenance. The lightweight of aerated concretes also help with lowering shipping costs.

Although favorable when compared to concretes, most conventional aerated concretes are prepared by processes that suffer from a number of deficiencies. The manufacture process of conventional aerated concretes involves special equipment, large energy consumption, and excessive carbon dioxide emission, leaving unfavorable carbon footprint. For example, aerated concretes are typically cured in autoclaves at temperatures ranging from 150° C. to 190° C. and at pressures ranging from 110 psi to 180 psi, to create a stable form of Tobermorite. Tobermorite is the primary binding element in aerated concrete. In addition, they are relatively expensive due to high finishing costs, difficulty to recycling, etc.

There is an on-going need for novel aerated composite materials that match or exceed the physical and performance characteristics of aerated concretes that can be mass-produced at lower cost with improved energy consumption and more desirable carbon footprint.

SUMMARY OF THE INVENTION

The invention is based in part on the unexpected discovery of novel aerated composite materials that possess excellent physical and performance characteristics of aerated concretes. These composite materials can be readily produced from widely available, low cost raw materials by a process suitable for large-scale production with reduced equipment need, improved energy consumption, and more desirable carbon footprint.

The formulation of aerated composite materials of the invention requires mostly readily available and low-cost materials that have minimal environmental impact. The raw materials include precursor materials such as particulate calcium silicate (e.g., ground wollastonite (CS), pseudo-wollastonite, rankinite ($C_3S_2$), gehlenite ($C_2AS$), belite ($C_2S$), and alite ($C_3S$) where "C" refers to calcium oxide or lime, wherein "S" refers to silicon dioxide or silica, "A" refers to aluminum oxide or alumina according to cement chemist notation (CCN)) along with certain traces of impurities that become bonding elements, and particulate filler materials (e.g., calcium oxide-containing material such as limestone, xonotlite, miro-silica, and quartz, lightweight aggregates such as perlite or vermiculite, or even industrial waste materials such as fly ash, bottom ash and slag). In order to obtain a material that is highly porous, an aerating agent is used (e.g., an aluminum powder or paste). A fluid component is also provided as a reaction medium, comprising liquid water and/or water vapor and a reagent, carbon dioxide ($CO_2$), which is consumed in the production as a reactive species and ends up sequestered in the final product. The bonding elements react at controlled temperatures and pressures either using the process of hydration in which the reaction occurs between water and water vapor, or using water vapor and $CO_2$.

Depending on end user requirements, various other additives such as dispersing, rheology modifying admixtures (to improve mixture consistency), coloring pigments, retarders, and accelerators. Additive materials can include natural or recycled materials, and calcium carbonate-rich and magnesium carbonate-rich materials, as well as additives to the fluid component, such as a water-soluble dispersant.

In addition, the aerated composite materials of the invention can be produced using the efficient gas-assisted hydrothermal liquid phase sintering (HLPS) process at low cost, less demanding equipment, and with much improved energy consumption and carbon footprint.

In one aspect, the invention generally relates to a process for producing an article of an aerated composite material. The process includes: (1) forming a wet mixture, wherein the wet mixture comprises: water, a ground calcium silicate, filler particles, and an aerating agent; (2) casting the wet mixture in a mold; (3) allowing the aerating agent to generate a gaseous product thereby causing volume expansion of the wet mixture; (4) pre-curing the expanded mixture at a temperature in the range from about 20° C. to about 100° C. under an atmosphere of water and $CO_2$ for a time sufficient to result in a pre-cured object suitable for achieving sufficient early-age strength required for de-molding and/or cutting; (5) de-molding and/or cutting the pre-cured object to desired dimensions; and (6) further curing the de-molded and/or cut pre-cured object at a temperature in the range from about 20° C. to about 100° C. for about 6 hour to about 60 hours under an atmosphere of water vapor and $CO_2$ to yield the article. The ground calcium silicate has a specific particle size, $d_{10}$ in the range from about 0.25 μm to about 5 μm, $d_{50}$ in the range from about 5 μm to about 20 μm, and $d_{90}$ in the range of about 25 μm to about 100 μm. The filler particles comprise calcium oxide or silica and have a particle size ($d_{50}$) in the range from about 0.25 μm to about 200 μm. The ground calcium silicate includes one or more of synthetic wollastonite, pseudo-wollastonite, rankinite, gehlenite, belite, and alite.

In another aspect, the invention generally relates to an article of manufacture produced by a process according to the invention.

In yet another aspect, the invention generally relates to an aerated composite material that includes: (1) a plurality of bonding elements characterized by a specific particle size, $d_{10}$ in the range from about 0.25 μm to about 5 μm, $d_{50}$ in the range from about 5 μm to about 20 μm, and $d_{90}$ in the range of about 25 μm to about 100 μm; (2) a plurality of filler particles having particle sizes in the range from about 0.5 μm to about 500 μm; and (3) a plurality of voids. Each bonding element comprises: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together. The plurality of voids are bubble-shaped and/or interconnected channels account for from about 50 vol. % to about 80 vol. % of the composite material. The aerated composite material exhibits a density from about 300 kg/m³ to 1500 kg/m³, a compressive strength from about 2.0 MPa to about 8.5 MPa, and a flexural strength from about 0.4 MPa to about 1.7 MPa.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
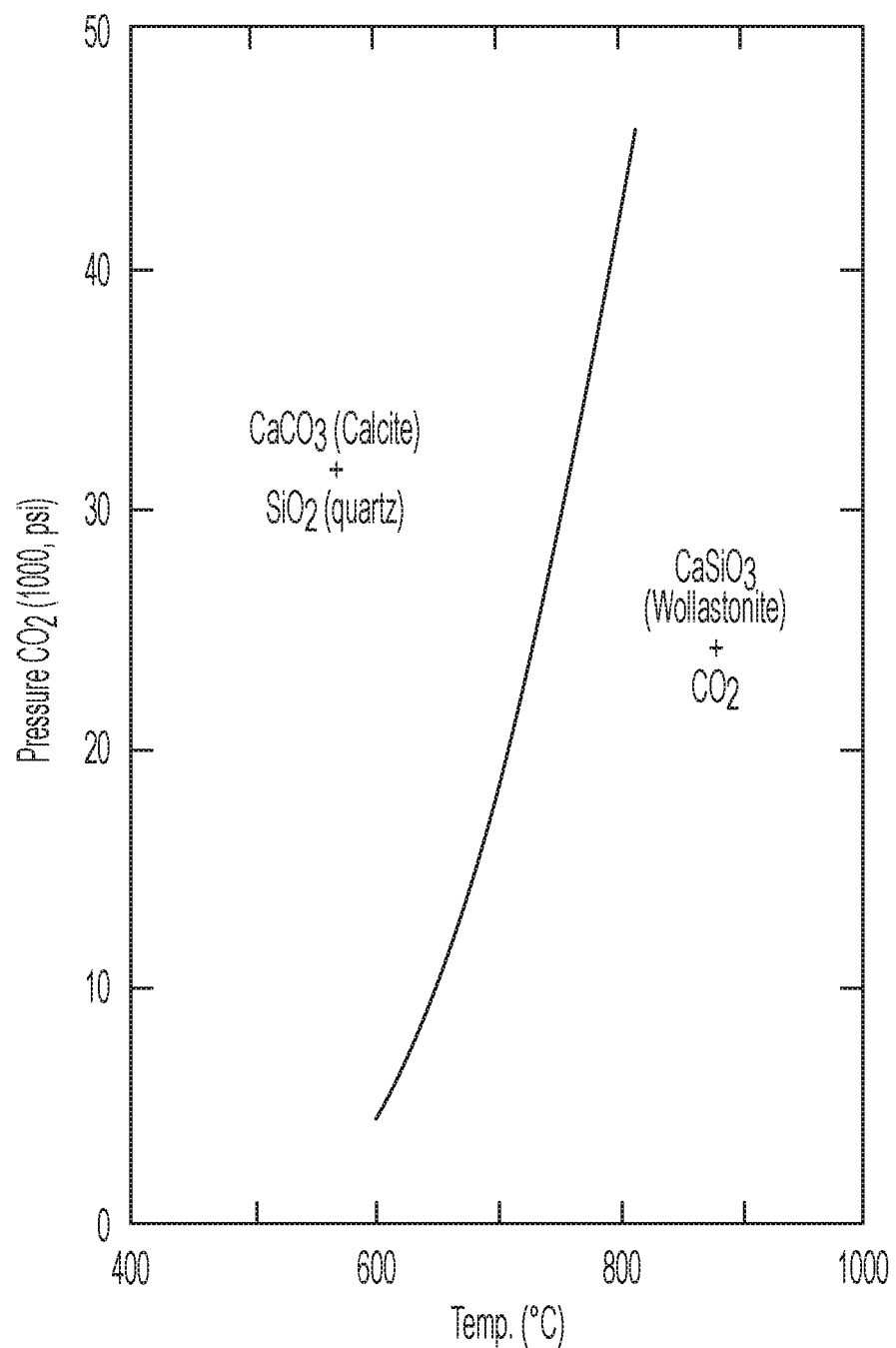
FIG. 1 is a pressure-temperature phase diagram showing the phases present in the reversible reaction $CaCO_3 + SiO_2 \leftrightarrow CaSiO_3$ (Wollastonite)$+CO_2$.
Figure 2:
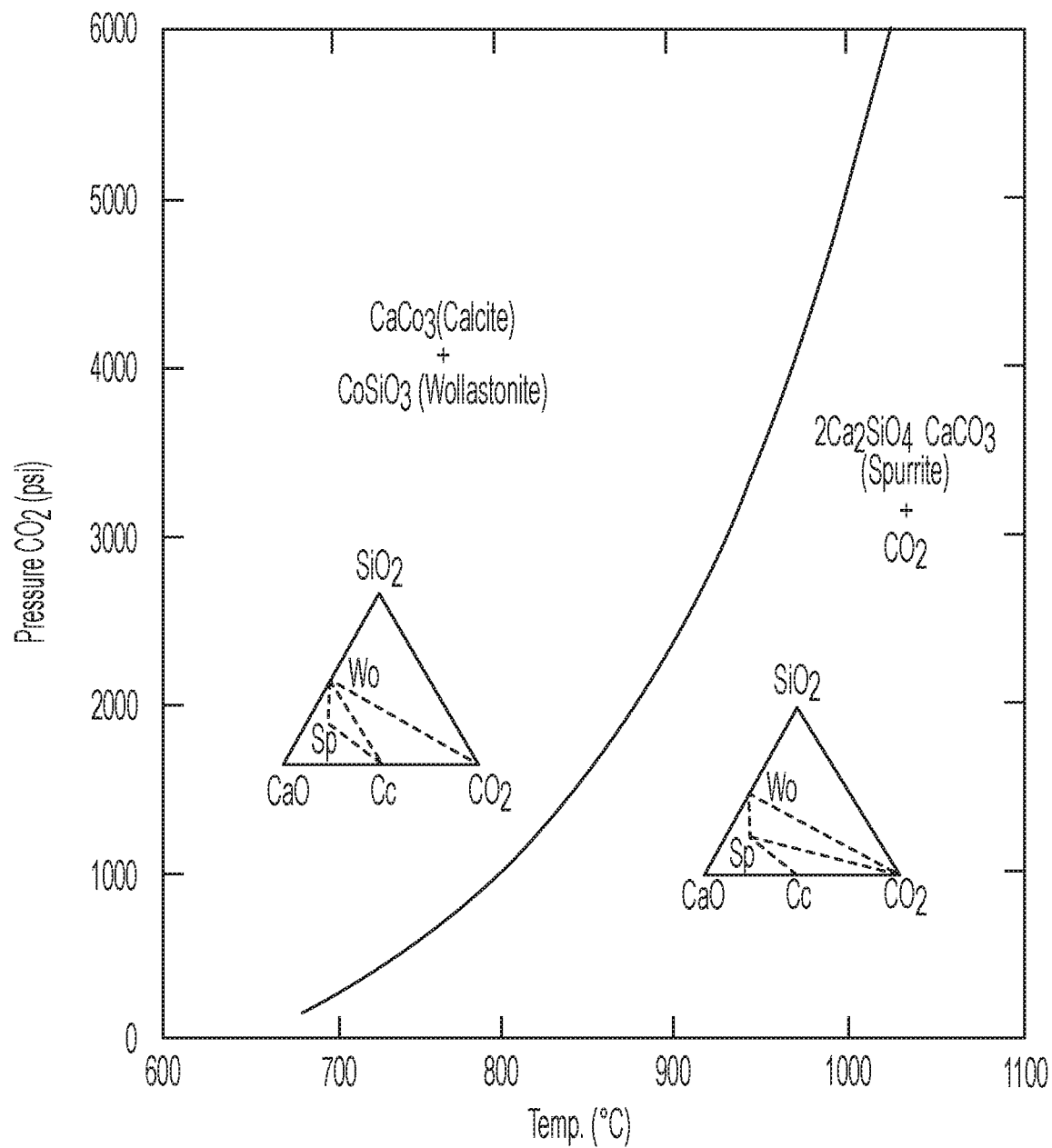
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
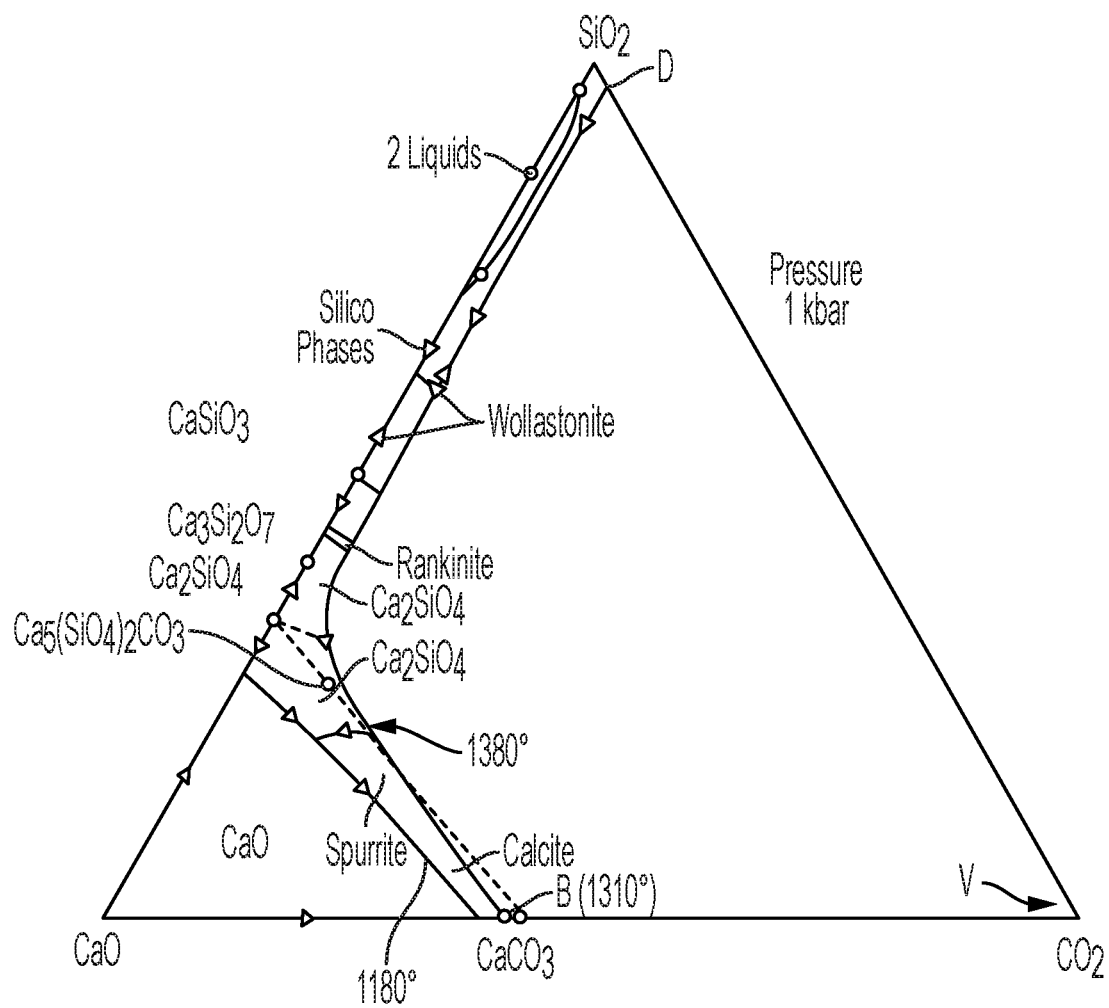
FIG. 3 is a phase diagram of the $CaO$—$SiO_2$—$CO_2$ system at a pressure of 1 kilobar.
Figure 4:
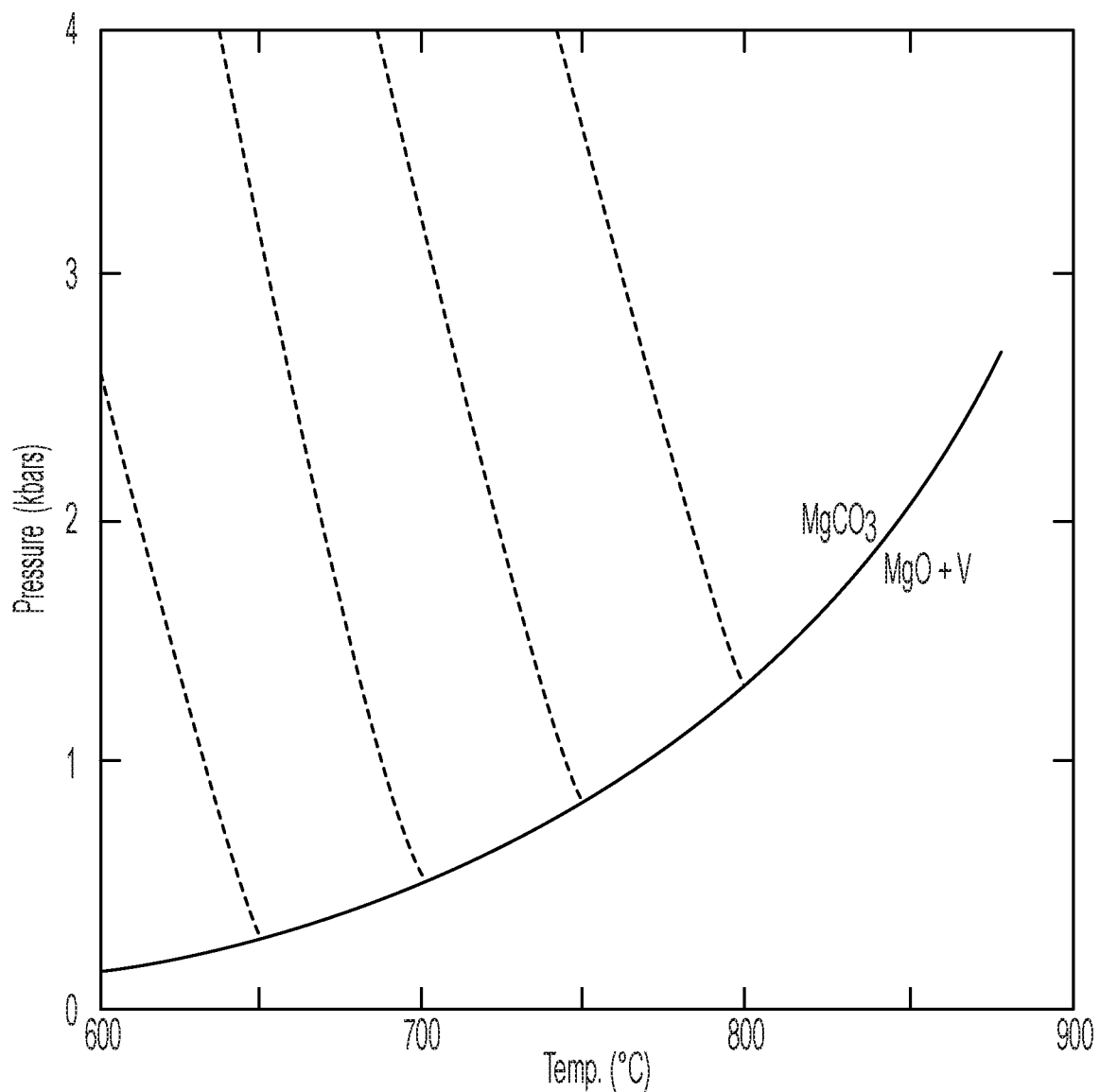
FIG. 4 is a pressure-temperature phase diagram showing the phases present in the reversible reaction $MgO + CO_2 \leftrightarrow MgCO_3$.
Figure 5:
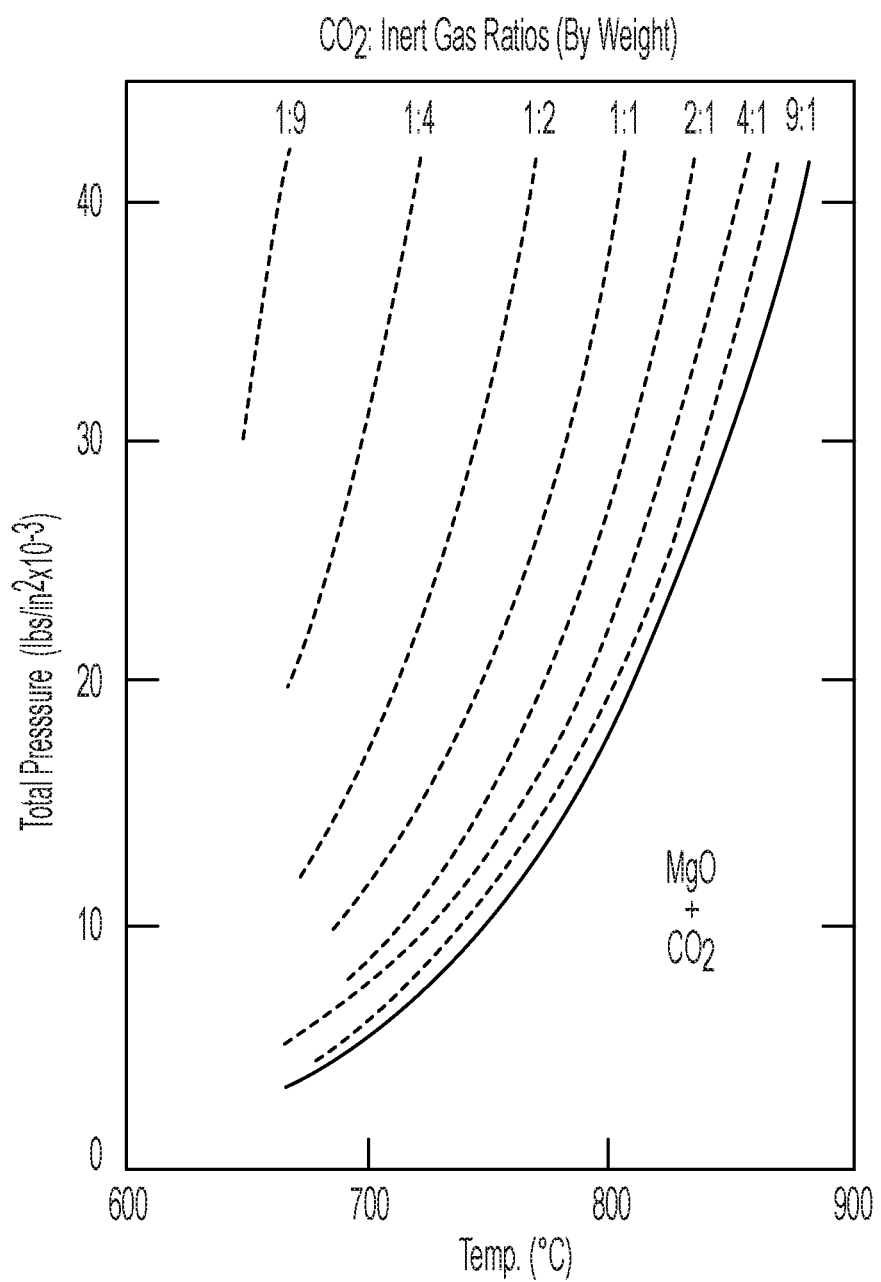
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
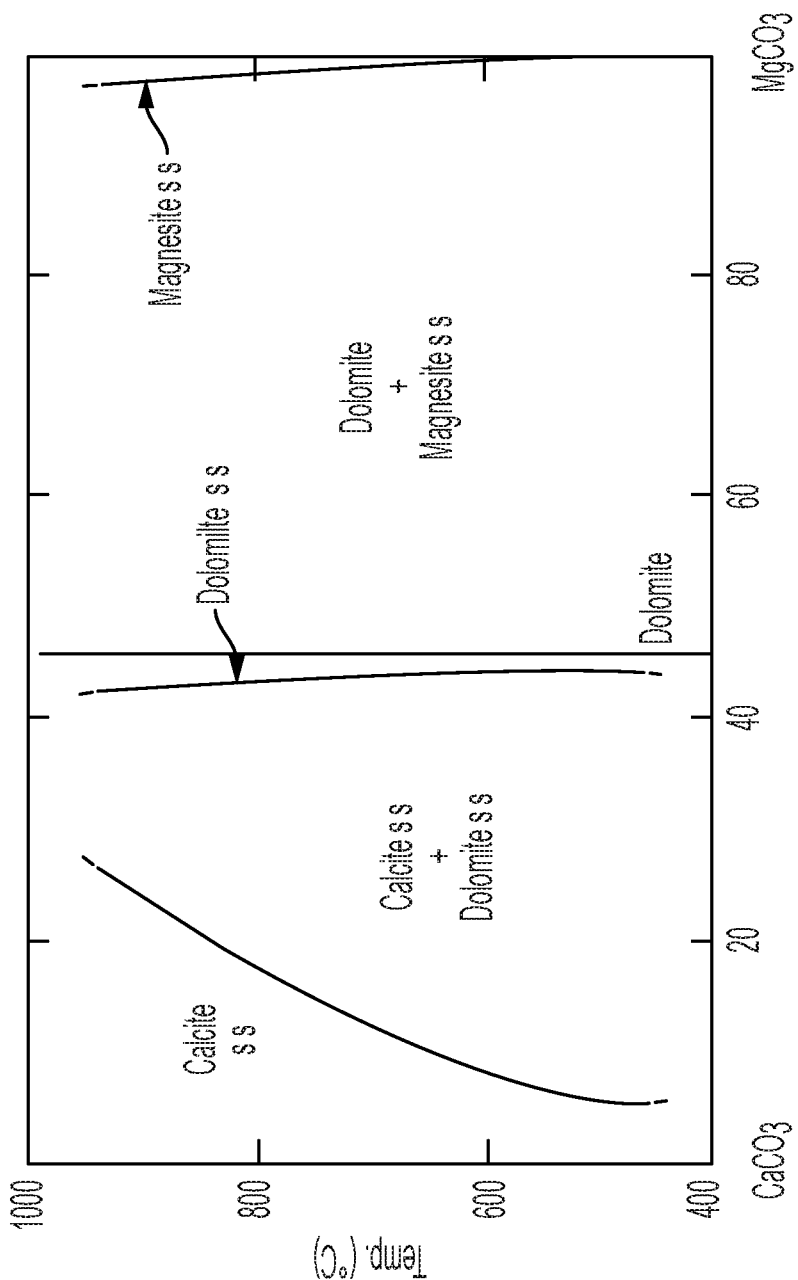
FIG. 6 is a temperature-composition phase diagram that illustrates the stability regions for various phases in the $CaCO_3$—$MgCO_3$ system.
Figure 7:
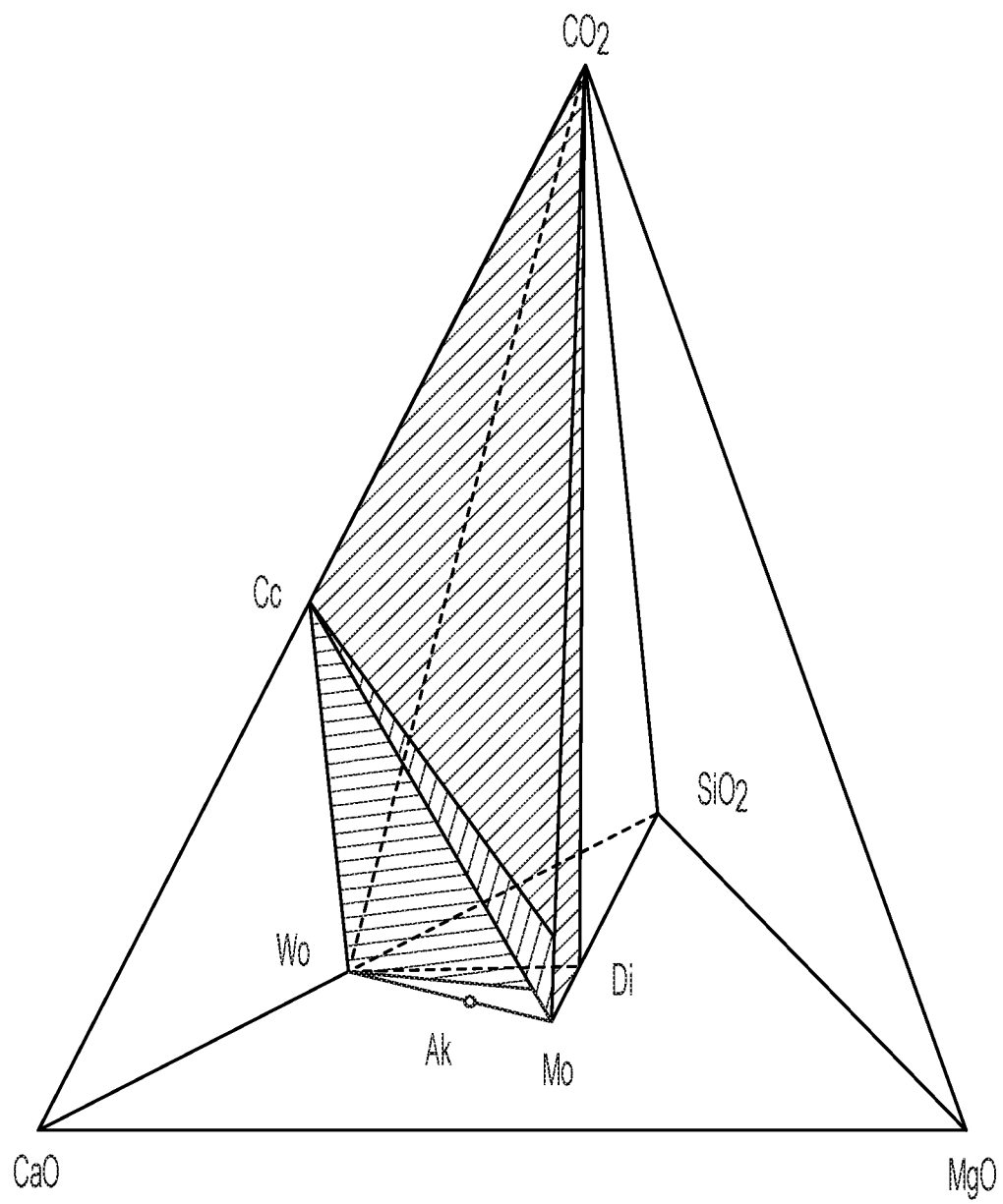
FIG. 7 is a tetrahedron diagram illustrating the phase relationships among the compounds $CaO$, $MgO$, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
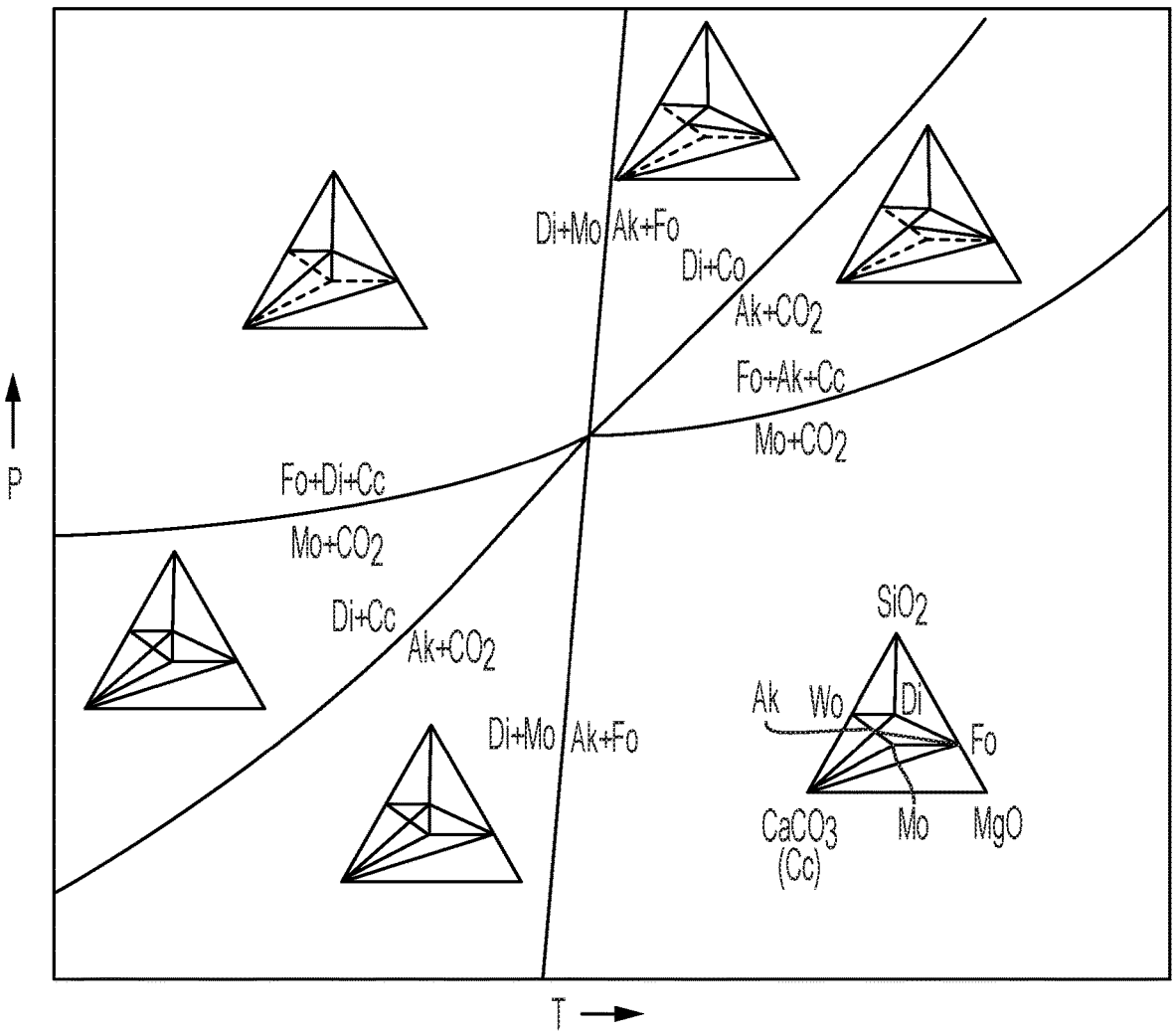
FIG. 8 is a pressure-temperature phase diagram illustrating the phase relationships among the compounds $CaO$, $MgO$, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, $MgO$ and $SiO_2$.

This invention provides novel aerated composite materials and products manufactured therefrom that possess excellent physical and performance properties characteristic of aerated concretes but can be readily produced from widely available, low cost raw materials by a process suitable for large-scale production with improved energy consumption, reduced equipment need (e.g., without the need for autoclaves), and more desirable carbon footprint.

The aerated composite materials of the invention can be used either in load-bearing or non load-bearing applications. The homogeneous nature of their pore structure also imparts superior thermal and acoustic insulation properties compared to conventional aerated concretes. Additionally, the aerated composite materials of the invention can be readily prepared with large dimensions such as a large wall, floor, or roof panels and landscaping blocks.

The aerated composite materials of the invention exhibit excellent insulating qualities (both thermal and sound) as well as fire resistance. They can be produced at large-scales with much improved energy efficiency and more desirable carbon footprint than convention aerated concrete.

The production of the aerated composite materials consumes $CO_2$ resulting in $CO_2$ net sequestration thereby making it carbon-neutral and exceptionally efficient from both financial and environmental conservation perspectives. In addition, the solid and homogeneous pore structures of these aerated composite materials create airtight building envelopes, minimizing uncontrolled air changes while helping maintain desired indoor temperatures while maximizing the efficiency of HVAC equipment. Additional benefits brought about by the unique aerated composite materials of the invention are reduction of material use, the ability to use recycled products, and avoidance of toxic emissions.

In one aspect, the invention generally relates to a process for producing an article of an aerated composite material. The process includes: (1) forming a wet mixture, wherein the wet mixture comprises: water, a ground calcium silicate, filler particles, and an aerating agent; (2) casting the wet mixture in a mold; (3) allowing the aerating agent to generate a gaseous product thereby causing volume expansion of the wet mixture; (4) pre-curing the expanded mixture at a temperature in the range from about 20° C. to about 100° C. under an atmosphere of water and $CO_2$ for a time sufficient to result in a pre-cured object suitable for achieving sufficient early-age strength required for de-molding and/or cutting; (5) de-molding and/or cutting the pre-cured object to desired dimensions; and (6) further curing the de-molded and/or cut pre-cured object at a temperature in the range from about 20° C. to about 100° C. for about 6 hour to about 60 hours under an atmosphere of water vapor and $CO_2$ (if required) to yield the article. The ground calcium silicate has a specific particle size, $d_{10}$ in the range from about 0.25 µm to about 5 µm, $d_{50}$ in the range from about 5 µm to about 20 µm, and $d_{90}$ in the range of about 25 µm to about 100 µm. The filler particles comprise calcium oxide or silica and have a particle size ($d_{50}$) in the range from about 0.25 µm to about 200 µm. The ground calcium silicate includes one or more of synthetic wollastonite, pseudo-wollastonite, rankinite, gehlenite, belite, and alite.

In certain embodiments, the wet mixture further includes: a set-controlling agent, a bubble stabilizing agent and a dispersing/viscosity-modifying agent. In certain embodiments, the wet mixture further includes an additive selected from dispersing, rheology modifying admixtures, pigments, retarders, and accelerators.

In certain embodiments, forming a wet mixture includes mixing the following ingredients in the specified order of addition: adding a pre-determined portion of water; adding and mixing the set-controlling admixture; adding and mixing the dispersing/viscosity-modifying agent; adding and mixing ground calcium silicate; adding and mixing the filler particles to form a uniform slurry; and adding and mixing the aerating agent.

In certain embodiments, the wet mixture comprises mixing the following ingredients in the specified percentages (wt % of the wet mixture): the ground calcium silicate in about 40 wt % to about 95 wt % (e.g., about 40 wt % to about 95 wt %, about 50 wt % to about 95 wt %, about 60 wt % to about 95 wt %, about 70 wt % to about 95 wt %, about 40 wt % to about 90 wt %, about 40 wt % to about 80 wt %, about 40 wt % to about 70 wt %, about 40 wt % to about 60 wt %), the filler particles in about 0 wt % to about 30 wt % (e.g., about 0 wt % to about 25 wt %, about 0 wt % to about 20 wt %, about 0 wt % to about 15 wt %, about 0 wt % to about 10 wt %, about 5 wt % to about 30 wt %, about 10 wt % to about 30 wt %, about 15 wt % to about 30 wt %, about 20 wt % to about 30 wt %), the set-controlling admixture in about 0 wt % to about 0.05 wt % (e.g., about 0 wt % to about 0.03 wt %, about 0 wt % to about 0.02 wt %, about 0.01 wt % to about 0.05 wt %, about 0.02 wt % to about 0.05 wt %, about 0.03 wt % to about 0.05 wt %), the dispersing/viscosity-modifying agent in about 0.05 wt % to about 0.25 wt % (e.g., about 0.05 wt % to about 0.20 wt %, about 0.05 wt % to about 0.15 wt %, about 0.05 wt % to about 0.10 wt %, about 0.10 wt % to about 0.25 wt %, about 0.15 wt % to about 0.25 wt %, about 0.20 wt % to about 0.25 wt %), and the aerating agent in about 0.05 wt % to about 0.30 wt % (e.g., about 0.05 wt % to about 0.25 wt %, about 0.05 wt % to about 0.20 wt %, about 0.05 wt % to about 0.15 wt %, about 0.05 wt % to about 0.10 wt %, about 0.15 wt % to about 0.30 wt %, about 0.20 wt % to about 0.30 wt %, about 0.25 wt % to about 0.30 wt %).

In certain embodiments, the first portion of water accounts for about 60% to about 95% (e.g., about 60% to about 90%, about 60% to about 80%, about 60% to about 70%, about 70% to about 95%, about 80% to about 95%, about 90% to about 95%) of and the second portion of water accounts for about 5% to about 40% (e.g., about 5% to about 30%, about 5% to about 20%, about 5% to about 10%, about 10% to about 40%, about 15% to about 40%, about 20% to about 40%, about 30% to about 40%) of total water content in the wet mixture. In certain embodiments, the first portion of water accounts for about 90% of and the second portion of water accounts for about 10% of total water content in the wet mixture.

In certain embodiments, pre-curing the expanded mixture is performed under a pressure ranging from ambient atmospheric pressure to about 30 psi above ambient and under a $CO_2$ concentration ranging from about 25% to about 99.5% (e.g., from about 50% to about 99.5%, from about 60% to about 99.5%, from about 70% to about 99.5%, from about 80% to about 99.5%, from about 90% to about 99.5%, from about 25% to about 99%, from about 25% to about 90%, from about 25% to about 80%, from about 50% to about 90%, from about 50% to about 80%, from about 50% to about 60%) to produce an aerated composite material.

In certain embodiments, the pre-curing step is performed at a temperature in the range from about 20° C. to about 80° C. (e.g., from about 20° C. to about 70° C., from about 20° C. to about 60° C., from about 30° C. to about 80° C., from about 40° C. to about 80° C., from about 50° C. to about 80° C., from about 60° C. to about 80° C.) for about 1 hour to about 10 hours (e.g., about 1 hour to about 8 hours, about 1 hour to about 6 hours, about 1 hour to about 4 hours, about 2 hours to about 10 hours, about 4 hours to about 10 hours, about 6 hours to about 10 hours) under a vapor comprising water and $CO_2$. In certain embodiments, the pre-curing step is performed at a temperature of about 60° C. for about 1 hour to about 5 hours (e.g., about 2, 3, 4, 5 hours) under a vapor comprising water and $CO_2$.

In certain embodiments, further curing the pre-cured object is performed at a temperature in the range from about 20° C. to about 80° C. (e.g., from about 20° C. to about 70° C., from about 20° C. to about 60° C., from about 30° C. to about 80° C., from about 40° C. to about 80° C., from about 50° C. to about 80° C., from about 60° C. to about 80° C.) for about 5 hours to about 40 hours (e.g., about 5 hours to about 30 hours, about 5 hours to about 20 hours, about 5 hours to about 15 hours, about 10 hours to about 40 hours, about 15 hours to about 40 hours, about 20 hours to about 40 hours) under a vapor comprising water and $CO_2$ and having a pressure in the range from about ambient atmospheric pressure to about 30 psi above ambient atmospheric pressure (e.g., from about ambient atmospheric pressure to about 20 psi above ambient atmospheric pressure, from about ambient atmospheric pressure to about 10 psi above ambient atmospheric pressure, from about 10 psi above ambient atmospheric pressure to about 30 psi above ambient atmospheric pressure).

In certain embodiments, further curing the pre-cured object is performed at a temperature in the range from about 30° C. to about 70° C. (e.g., from about 30° C. to about 60° C., from about 30° C. to about 50° C., from about 30° C. to about 40° C., from about 40° C. to about 70° C., from about 50° C. to about 70° C., from about 60° C. to about 70° C., from about 30° C. to about 60° C.) for about 10 hours to about 30 hours (e.g., about 10 hours to about 25 hours, about 10 hours to about 20 hours, about 10 hours to about 15 hours, about 15 hours to about 30 hours, about 20 hours to about 30 hours) under a vapor comprising water and $CO_2$ and having a pressure in the range from about ambient atmospheric pressure to about 60 psi above ambient atmospheric pressure (e.g., about ambient atmospheric pressure to about 60 psi above ambient atmospheric pressure, about ambient atmospheric pressure to about 50 psi above ambient atmospheric pressure, about ambient atmospheric pressure to about 40 psi above ambient atmospheric pressure, about ambient atmospheric pressure to about 30 psi above ambient atmospheric pressure, about ambient atmospheric pressure to about 20 psi above ambient atmospheric pressure, about 10 psi above ambient atmospheric pressure to about 60 psi above ambient atmospheric pressure, about 20 psi above ambient atmospheric pressure to about 60 psi above ambient atmospheric pressure, about 30 psi above ambient atmospheric pressure to about 60 psi above ambient atmospheric pressure, about 40 psi above ambient atmospheric pressure to about 60 psi above ambient atmospheric pressure).

In certain embodiments, the pre-curing and further curing is carried out under a dynamic $CO_2$ circulating flow condition.

The relative humidity environment of the curing process may be adjusted to fit the desired outcome, for example, ranging from about 50% to about 98% (e.g., from about 60% to about 98%, from about 70% to about 98%, from about 80% to about 98%, from about 90% to about 98%, from about 50% to about 90%, from about 50% to about 80%, from about 50% to about 70%) to produce an aerated composite material exhibiting a uniform, homogeneous, and highly porous structure.

In certain embodiments, the process further includes, after curing the pre-cured object, drying the cured object to remove residual water at a temperature in the range from about 20° C. to about 110° C. (e.g., from about 20° C. to about 100° C., from about 20° C. to about 90° C., from about 20° C. to about 80° C., from about 20° C. to about 70° C., from about 20° C. to about 60° C., from about 20° C. to about 110° C., from about 40° C. to about 110° C., from about 50° C. to about 110° C., from about 60° C. to about 100° C.) for about 12 hours to about 96 hours (e.g., about 12 hours to about 72 hours, about 12 hours to about 60 hours, about 12 hours to about 48 hours, about 12 hours to about 36 hours, about 12 hours to about 24 hours, about 24 hours to about 96 hours, about 36 hours to about 96 hours, about 36 hours to about 48 hours).

In certain embodiments, the strength imparting components at the end of the curing process consist primarily of calcium carbonate ($CaCO_3$ or calcite) along with amorphous calcium-silicate phases, and minor quantities of calcium-silicate hydrate (C—S—H) gel and calcium hydroxide (CH).

Thus, various combinations of curing conditions may be devised to achieve the desired production process, including varied reaction temperatures, pressures and lengths of reaction.

In certain embodiments, the ground calcium silicate is selected from wollastonite, pseudo-wollastonite, rankanite, belite, and alite.

In certain embodiments, the ground calcium silicate or synthetic wollastonite consisting of ground wollastonite (CS) in an equivalent, 1:1, or 2:1 proportion, pseudo-wollastonite, rankinite ($C_3S_2$), gehlenite ($C_2AS$), belite ($C_2S$), and alite ($C_3S$) where "C" refers to calcium oxide or lime, "S" refers to silicon dioxide or silica, "A" refers to aluminum oxide or alumina according to cement chemist notation (CCN) along with certain traces of impurities.

The ground calcium silicate are characterized by $d_{10}$ in the range from about 0.25 µm to about 5 µm (e.g., from about 0.25 µm to about 4 µm, from about 0.25 µm to about 3 µm, from about 0.25 µm to about 2 µm, from about 0.25 µm to about 1 µm, from about 0.5 µm to about 5 µm, from about 1 µm to about 5 µm, from about 2 µm to about 5 µm), $d_{50}$ in the range from about 5 µm to about 20 µm (e.g., from about 5 µm to about 15 µm, from about 5 µm to about 10 µm, from about 10 µm to about 20 µm, from about 15 µm to about 20 µm), and $d_{90}$ in the range from about 25 µm to about 100 µm (e.g., about 25 µm to about 80 µm, about 25 µm to about 70 µm, about 25 µm to about 60 µm, about 25 µm to about 50 µm, about 40 µm to about 100 µm, about 50 µm to about 100 µm, about 60 µm to about 100 µm, about 70 µm to about 100 µm).

Any suitable filler particles may be used, for example, calcium oxide-containing or silica-containing materials. Exemplary filler particles include lime, quartz (including sand), wollastonite, xonotlite, burned oil shale, fly- or volcanic-ash, stack dust from kilns, ground clay, pumice dust. Materials such as industrial waste materials (e.g., fly ash, slag, silica fume) may also be used as fillers. In certain preferred embodiments, light-weight aggregates such as perlite or vermiculite may also be used as fillers. In certain preferred embodiments, filler particles are made from a calcium oxide-rich material such as ground lime.

As used herein, the term "lime" refers to naturally occurring or synthetic inorganic materials in which calcium oxide or calcium hydroxide predominate.

As used herein, The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})$).

The filler particles comprise calcium oxide or silica and have a particle size ($d_{50}$) in the range from about 0.25 µm to about 200 µm (e.g., from about 0.25 µm to about 150 µm, from about 0.25 µm to about 100 µm, from about 0.25 µm to about 50 µm, from about 0.25 µm to about 20 µm, from about 0.25 µm to about 10 µm, from about 0.5 µm to about 200 µm, from about 1 µm to about 200 µm, from about 5 µm to about 200 µm, from about 10 µm to about 200 µm, from about 20 µm to about 200 µm, from about 50 µm to about 200 µm).

In certain embodiments, the filler particles are selected from fly ash, bottom ash, slag having particle sizes ranging from about 0.5 µm to about 300 µm (e.g., from about 1 µm to about 300 µm, from about 5 µm to about 300 µm, from about 10 µm to about 300 µm, from about 50 µm to about 300 µm, from about 100 µm to about 300 µm, from about 0.5 µm to about 200 µm, from about 0.5 µm to about 100 µm, from about 0.5 μm to about 50 μm, from about 0.5 μm to about 20 μm, from about 0.5 μm to about 10 μm, from about 0.5 μm to about 5 μm).

In certain embodiments, the filler particles are selected from limestone, miro-silica, and quartz having particle sizes ranging from about 1 μm to about 500 μm (e.g., from about 1 μm to about 400 μm, from about 1 μm to about 300 μm, from about 1 μm to about 200 μm, from about 1 μm to about 100 μm, from about 1 μm to about 50 μm, from about 1 μm to about 30 μm, from about 5 μm to about 500 μm, from about 10 μm to about 500 μm, from about 20 μm to about 500 μm, from about 50 μm to about 500 μm, from about 100 μm to about 500 μm, from about 200 μm to about 500 μm).

In certain embodiments, the filler particles are selected from lightweight aggregates having particle sizes ranging from about 20 μm to about 500 μm (e.g., from about 20 μm to about 400 μm, from about 20 μm to about 300 μm, from about 20 μm to about 200 μm, from about 20 μm to about 100 μm, from about 50 μm to about 500 μm, from about 100 μm to about 500 μm, from about 200 μm to about 500 μm, from about 300 μm to about 500 μm).

In certain embodiments, the set-controlling admixture is selected from a gluconate and sucrose. In certain embodiments, the dispersing/viscosity-modifying agent is a polycarboxilate based material.

In exemplary embodiments, the ground calcium silicate is ground wollastonite, the filler particles comprises ground limestone, and silica, the activating-agent is ground lime, the set-controlling admixture is a gluconate, the viscosity-modifying agent is a polycarboxilate based material, and the aerating agent is aluminum paste.

The plurality of voids serve to reduce the overall density of the aerated composite material while at the same time provide a three-dimensional porous network that facilitates uniform and expedited curing of the composite material. The plurality of voids may account for any suitable fraction of the overall volume of the aerated composite material dependent on the desired properties and applications at hand. For example, the plurality of voids may account for from about 50 vol. % to about 80 vol. % (e.g., from about 60 vol. % to about 80 vol. %, from about 65 vol. % to about 80 vol. %, about 60%, about 65%, about 70%, about 75%, about 80%) of the overall volume of the aerated composite material.

The plurality of voids are caused by a gaseous material generated by an aerating agent. In certain preferred embodiments, the aerating agent includes a metal capable of reacting with acid to generate gaseous hydrogen. Exemplary aerating agents include: powder or paste of aluminum, powder of iron, powder of zinc, powder of calcium carbide, and hydrogen peroxide, or a mixture thereof. The aerating agents may have any suitable sizes, for example, ranging from about 10 μm to about 50 μm (e.g., from about 10 μm to 40 μm, from about 10 μm to 30 μm, from about 10 μm to 20 μm, from about 15 μm to 40 μm, from about 15 μm to 30 μm, from about 20 μm to 40 μm, larger than about 40 μm).

In another aspect, the invention generally relates to an article of manufacture produced by a process according to the invention.

The aerated composite material and/or the article of manufacture may be characterized by a density from about 300 kg/m³ to about 1500 kg/m³ (e.g., about 300 kg/m³ to 1200 kg/m³, about 300 kg/m³ to 1000 kg/m³, about 300 kg/m³ to 900 kg/m³, about 400 kg/m³ to 1200 kg/m³, about 400 kg/m³ to 1000 kg/m³, about 400 kg/m³ to 900 kg/m³, about 500 kg/m³ to 1200 kg/m³, about 500 kg/m³ to 1000 kg/m³).

The aerated composite materials of the invention exhibit excellent compressive strength. For example, the aerated composite material and/or the article of manufacture may be characterized by a compressive strength from about 2.0 MPa to about 8.5 MPa (e.g., from about 2.0 MPa to about 6.0 MPa, from about 2.0 MPa to about 5.0 MPa, from about 3.0 MPa to about 8.5 MPa, from about 3.0 MPa to about 6.0 MPa, from about 3.0 MPa to about 5.0 MPa, from about 4.0 MPa to about 8.5 MPa).

The aerated composite materials of the invention also exhibit excellent flexural strength. For example, the aerated composite material and/or the article of manufacture may be characterized by a flexural strength from about 0.4 MPa to about 1.7 MPa (e.g., from about 0.7 MPa to about 1.7 MPa, from about 1.0 MPa to about 1.7 MPa, from about 1.2 MPa to about 1.7 MPa, from about 1.0 MPa to about 1.5 MPa, from about 1.2 MPa to about 1.5 MPa).

In certain exemplary embodiments, the aerated composite material exhibits a density from about 400 kg/m³ to 1200 kg/m³, a compressive strength from about 3.0 MPa to about 6.0 MPa, and a flexural strength from about 0.66 MPa to about 1.32 MPa. In certain embodiments, the aerated composite material exhibits a density from about 500 kg/m³ to 1000 kg/m³, a compressive strength from about 4.0 MPa to about 6.0 MPa, and a flexural strength from about 0.88 MPa to about 1.32 MPa.

The aerated composite material may be prepared to exhibit a desired density and mechanical properties (e.g., meeting or exceeding the specifications of strength classes for Aerated Concrete according to ASTM C1693-11).

TABLE 1

| ASTM Classifications | | | |
| --- | --- | --- | --- |
| Strength Class | Compressive strength psi (MPa) minimum | Nominal Dry Bulk Density kg/m³ Lower limit | Density Limits kg/m³ Upper limit |
| AAC-2 | 290 (2.0) | 350 | 550 |
| AAC-3 | 435 (3.0) | 450 | 650 |
| AAC-4 | 580 (4.0) | 450 | 650 |
| AAC-5 | 725 (5.0) | 550 | 750 |
| AAC-6 | 870 (6.0) | 550 | 750 |

In yet another aspect, the invention generally relates to an aerated composite material that includes: (1) a plurality of bonding elements characterized by a specific particle size, $d_{10}$ in the range from about 0.25 μm to about 5 μm, $d_{50}$ in the range from about 5 μm to about 20 μm, and $d_{90}$ in the range of about 25 μm to about 100 μm; (2) a plurality of filler particles having particle sizes in the range from about 0.5 μm to about 500 μm; and (3) a plurality of voids. Each bonding element comprises: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together. The plurality of voids are bubble-shaped and/or interconnected channels account for from about 50 vol. % to about 80 vol. % of the composite material. The aerated composite material exhibits a density from about 300 kg/m³ to 1500 kg/m³, a compressive strength from about 2.0 MPa to about 8.5 MPa, and a flexural strength from about 0.4 MPa to about 1.7 MPa.

In certain embodiments, the plurality of bonding elements are chemically transformed from a precursor calcium silicate other than wollastonite by reacting it with $CO_2$ via a controlled hydrothermal liquid phase sintering process. In certain embodiments, the plurality of bonding elements are chemically transformed from a precursor calcium silicate comprising one or more of aluminum, magnesium and iron.

The aerated composite material may further include one or more additives to modify the appearance, physical or mechanical properties of the product. Exemplary additives include rheology modifying admixtures, pigments, retarders, and accelerators.

In certain embodiments, the pigment may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

Aerated composite materials of the invention may be used to manufacture a wide range of products of various sizes and dimensions including, for example, standard blocks, cored blocks, cladding blocks, shaftwall and fire blocks, lintel blocks, tongue and groove blocks, wall panels, floor panels, roof panels, plates, sidings, frames, fences, decorative and landscaping products, parking stops, etc. The variety of products can be produced from widely available, low cost raw materials by a process that does not require autoclaves and is suitable for continuous, large-scale production. The production methods are much improved over conventional aerated concretes in terms of both economics and environmental impact.

Bonding Elements, Bonding Matrices and Composite Materials

Chemical Discussion

This invention provides apparatus and methods used to manufacture novel composite materials that are cured predominantly by a $CO_2$ consumption reaction. The materials exhibit useful properties and can be readily produced from widely available, low cost precursor materials by a process suitable for large-scale production with minimal environmental impact. The precursor materials include inexpensive and abundant calcium silicate rich materials, fine particles and coarse particles. The calcium silicate rich materials may be comprised of ground Wollastonite. The fine and coarse particles may be comprised of ground limestone or other calcium carbonate based materials, ground quartz or other $SiO_2$ based materials, sand and crushed rock. The fine and coarse particles may also be comprised of crushed minerals such as granite, mica and feldspar. Other process components include water and $CO_2$. Various additives can be used to modify and fine-tune the physical appearance and/or mechanical properties of the resulting composite material, such as additives selected from one or more of pigments (e.g., black iron oxide, cobalt oxide and chromium oxide), colored glass and/or colored quartz. Additives regarding water usage reduction and changes in rheology can also be used.

The composite materials can be produced, as disclosed herein, using the energy-efficient Hydrothermal Liquid Phase Sintering (HLPS) process to create bonding elements which hold together the various components of the composite material. The composite materials can be manufactured at low cost and with favorable environmental impact. For example in preferred embodiments of the invention, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS can be found in U.S. Pat. No. 8,114,367, U.S. Pub. No. US 2009/0143211 (application. Ser. No. 12/271,566), U.S. Pub. No. US 2011/0104469 (application. Ser. No. 12/984,299), U.S. Pub. No. 2009/0142578 (application. Ser. No. 12/271,513), U.S. Pub. No. 2013/0122267 (application. Ser. No. 13/411,218), U.S. Pub. No. 2012/0312194 (application. Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. patent application Ser. Nos. 14/045,758, 14/045,519, 14/045,766, 14/045,540, all filed Oct. 3, 2013, U.S. patent application Ser. Nos. 14/207,413, 14/207,421, filed Mar. 12, 2014, U.S. patent application Ser. Nos. 14/207,920, 14/209,238, filed Mar. 13, 2014, U.S. patent application Ser. Nos. 14/295,601, 14/295,402, filed Jun. 4, 2014, each of which is expressly incorporated herein by reference in its entirety for all purposes.

As used herein, the term "calcium silicate" refers to naturally-occurring minerals or synthetic materials that are comprised of one or more of a group of calcium-silicon-containing compounds including CS (wollastonite or pseudowollastonite, and sometimes formulated $CaSiO_3$ or $CaO·SiO_2$), C3S2 (rankinite, and sometimes formulated as $Ca_3Si_2O_7$ or $3CaO·2SiO_2$), C2S (belite, $\beta$-$Ca_2SiO_4$ or larnite, $\beta$-$Ca_2SiO_4$ or bredigite, $\alpha$-$Ca_2SiO_4$ or $\gamma$-$Ca_2SiO_4$, and sometimes formulated as $Ca_2SiO_4$ or $2CaO·SiO_2$), a calcium silicate rich amorphous phase, each of which materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. FIG. 1 through FIG. 8 are phase diagrams that show various phase interrelationships among some of the materials described.

The calcium-silicon-containing compounds may also include both crystalline and amorphous calcium-silicate phases, which may also comprise of other iron, magnesia, potassium, sodium, and alumina based compounds.

It should be understood that, compositions and methods disclosed herein can be adopted to use magnesium silicate in place of or in addition to calcium silicate. As used herein, the term "magnesium silicate" refers to nationally-occurring minerals or synthetic materials that are comprised of one or more of a groups of magnesium-silicon-containing compounds including, for example, $Mg_2SiO_4$ (also known as "fosterite"), $Mg_3Si_4O_{10}(OH)_2$ (also known as "Talc"), and $CaMgSiO_4$ (also known as "monticellite"), each of which materials may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})(OH)_2$).

In certain preferred embodiments, the plurality of bonding elements are prepared by chemical transformation from ground calcium silicate compositions by reacting them with $CO_2$ via a gas-assisted HLPS process by reacting it with $CO_2$ via a gas-assisted HLPS process.

In certain embodiments, the composite material is characterized by a compressive strength from about 90 MPa to about 175 MPa (e.g., about 90 MPa to about 150 MPa, about 90 MPa to about 140 MPa, about 90 MPa to about 130 MPa, about 90 MPa to about 120 MPa, about 90 MPa to about 110 MPa, about 100 MPa to about 175 MPa, about 120 MPa to about 175 MPa, about 130 MPa to about 175 MPa, about 140 MPa to about 175 MPa, about 150 MPa to about 175 MPa, about 160 MPa to about 175 MPa).

In certain embodiments, the composite material is characterized by a flexural strength from about 5 MPa to about 30 MPa (e.g., about 5 MPa to about 25 MPa, about 5 MPa to about 20 MPa, about 5 MPa to about 15 MPa, about 5 MPa to about 10 MPa, about 10 MPa to about 30 MPa, about 20 MPa to about 30 MPa, about 25 MPa to about 30 MPa).

In certain embodiments, the composite material is characterized by water absorption of less than about 10% (e.g., less than about 8%, 5%, 4%, 3%, 2%, or 1%).

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

Equipment and Processing Discussion
$CO_2$ Control

In the embodiments described, industrial grade $CO_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at a temperature such that it maintains a vapor pressure of approximately 300 PSIG. This gas is then piped to a $CO_2$ curing enclosure or chamber. In the simplest system, $CO_2$ is flowed through the enclosure at a rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so s to maintain a concentration of $CO_2$ sufficient to drive the curing reaction.

As an example, we now describe a method for sustaining carbon dioxide concentrations during the reaction that is well suited for keeping a highly consistent concentration, although it is a "closed loop" process which tends to be the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as NDIR should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 9:
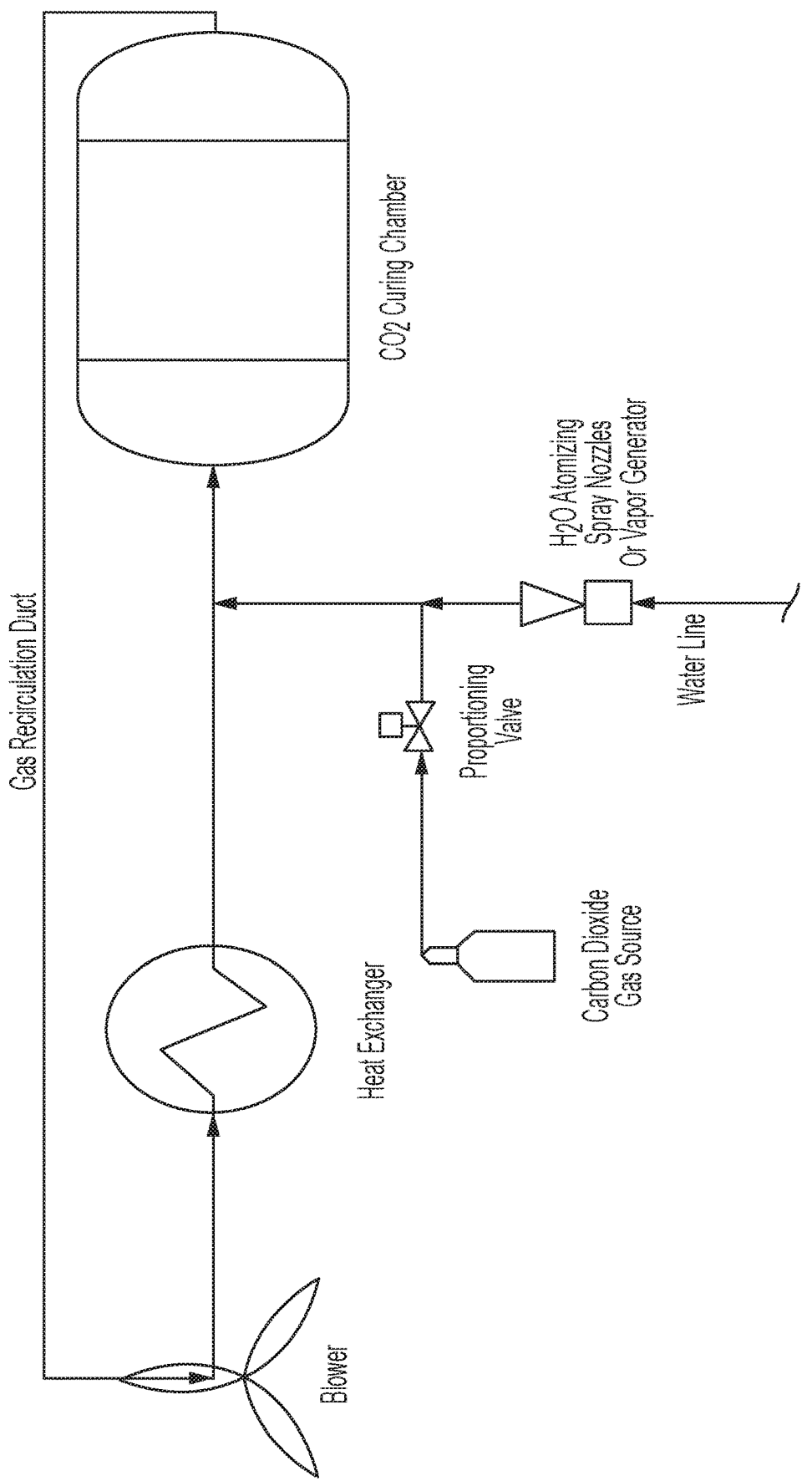
FIG. 9 is a schematic diagram of a $CO_2$ composite material curing chamber that provides humidification according to principles of the invention.

FIG. 9 is a schematic diagram of a $CO_2$ composite material curing chamber that provides humidification according to principles of the invention. In FIG. 9, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the $CO_2$ supply can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in $CO_2$ composite material curing processes that could be combined into a single system. One method for humidification in one embodiment of a $CO_2$ curing system is represented in FIG. 9. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 10:
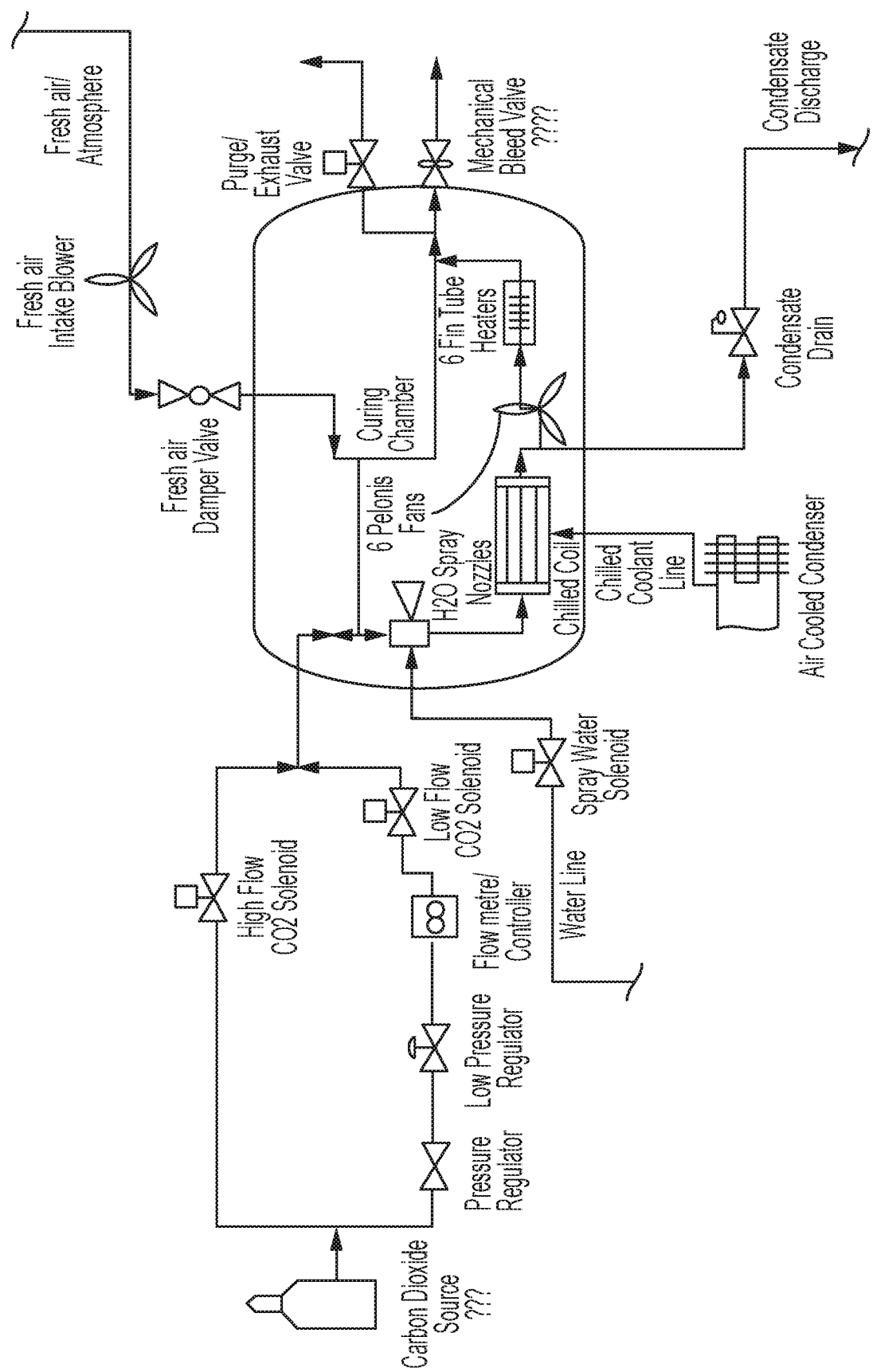
FIG. 10 is a schematic diagram of a curing chamber with multiple methods of humidity control as well as ability to control and replenish $CO_2$ using constant flow or pressure regulation and that can control the temperature according to principles of the invention.

FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a sensor such as a thermocouple or an RTD. The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

Process of Preparing a Composite Material

We describe a process for preparing a composite material. The process includes: mixing a particulate composition and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production, and curing the formed slurry mixture at a temperature in the range from about 20° C. to about 150° C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a texture and/or a pattern and the desired physical properties related to compressive strength, flexural strength, density, resistance to degradation, and so forth.

The particulate composition includes a ground calcium silicate having a median particle size in the range from about 1 μm to about 100 μm. In addition the particulate composition may include a ground calcium carbonate or a $SiO_2$ bearing material having a median particle size in the range from about 3 μm to about 25 mm. The liquid composition includes water and may include a water-soluble dispersant.

The process can further include, before curing the casted mixture, the step of drying the casted mixture. The particulate composition further comprises a pigment or a colorant as discussed herein.

In certain embodiments, curing the formed slurry mixture is performed at a temperature in the range from about 30° C. to about 120° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 60° C. to about 110° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 80° C. to about 100° C. for about 1 hour to about 60 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature equal to or lower than about 60° C. for about 1 hour to about 50 hours under a vapor comprising water and $CO_2$ and having an ambient atmospheric pressure.

For example, in some embodiments, the ground calcium silicate has a median particle size from about 1 μm to about 100 μm (e.g., about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 $m^2$/kg to about 700 $m^2$/kg (e.g., 150 $m^2$/kg, 200 $m^2$/kg, 250 $m^2$/kg, 300 $m^2$/kg, 350 $m^2$/kg, 400 $m^2$/kg, 450 $m^2$/kg, 500 $m^2$/kg, 550 m2/kg, 600 m2/kg, 650 m2/kg, 700 m2/kg).

In certain preferred embodiments, the liquid composition includes water and a water-soluble dispersant comprising a polymer salt (e.g., an acrylic homopolymer salt) having a concentration from about 0.1% to about 2% w/w of the liquid composition.

Composite materials prepared according to a process disclosed herein can exhibit a compressive strength from about 3.0 MPa to about 30.0 MPa (e.g., about 3 MPa, 5 MPa, 10 MPa, 15 MPa, 20 MPa, 25 MPa, 30 MPa) and a flexural strength from about 0.3 MPa to about 4.0 MPa (e.g., about 0.3 MPa, 0.5 MPa, 1.0 MPa, 1.5 MPa, 2.0 MPa, 2.5 MPa, 3.0 MPa, 3.5 MPa, 4.0 MPa).

We also describe one or more articles of manufacture made from a composite material.

Any suitable precursor materials may be employed including, for example, calcium silicate composition particles formed from CS (wollastonite or pseudowollastonite, and sometimes formulated $CaSiO_3$ or $CaO \cdot SiO_2$), C3S2 (Rankinite, and sometimes formulated as $Ca_3Si_2O_7$ or $3CaO \cdot 2SiO_2$), C2S (belite, $\beta$-$Ca_2SiO_4$ or larnite, $\beta$-$Ca_2SiO_4$ or "bredigite, $\alpha$-$Ca_2SiO_4$ or $\gamma$-$Ca_2SiO_4$, and sometimes formulated as $Ca_2SiO_4$ or $2CaO \cdot SiO_2$), and a calcium silicate rich amorphous phase. It is believed that calcium cations are leached from the calcium silicate composition particles and transform the peripheral portion of the calcium silicate composition particle into calcium-deficient state. As the calcium cations continue to be leached from the peripheral portion of the particle, the structure of the peripheral portion eventually become unstable and breaks down, thereby transforming the calcium-deficient peripheral portion of the particle into a predominantly silica-rich first layer. Meanwhile, a predominantly calcium carbonate second layer precipitates from the water.

More specifically, the first layer and second layer may be formed from the precursor particle according the following reactions (1-3) which can use water as a reaction medium, and not as a reagent (that is, the water is not consumed):

$$CaSiO_3(s) + CO_2(g) \rightarrow CaCO_3(s) + SiO_2(s) \quad (1)$$

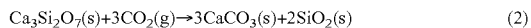

$$Ca_3Si_2O_7(s) + 3CO_2(g) \rightarrow 3CaCO_3(s) + 2SiO_2(s) \quad (2)$$

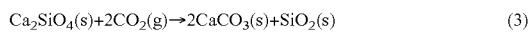

$$Ca_2SiO_4(s) + 2CO_2(g) \rightarrow 2CaCO_3(s) + SiO_2(s) \quad (3)$$

For example, in a silicate mineral carbonation reaction such as with calcium silicate compositions, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

Thus, according to a preferred embodiment of the invention, $CO_2$ preferentially reacts with the calcium cations of the calcium silicate composition precursor core, thereby transforming the peripheral portion of the precursor core into a silica-rich first layer and a calcium carbonate-rich second layer. Also, the presence of the first and second layers on the core act as a barrier to further reaction between calcium silicate and carbon dioxide, resulting in the bonding element having the core, first layer and second layer.

In some embodiments, silicate materials having metals other than Ca or in addition to Ca, for example fosterite ($Mg_2SiO_4$), diopside ($CaMgSi_2O_6$), and talc ($Mg_3Si_4O_{10}(OH)_2$) can react with carbon dioxide dissolved in water in a manner similar to the reaction of calcium silicate, as described above. It is believed that such silicate materials can be used, alone, in combination, and/or in combination with calcium silicate, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, 87$^{th}$ Edition 2006-2007, CRC.) This partially infiltrated state enables the reaction to proceed to a high degree of carbonation in a fixed period of time.

Liquid water in the pores speeds up the reaction rate because it provides a medium for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is present in the precursor material (e.g., as residual water from prior mixing step) and liquid water is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a second exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a third exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is performed at about 25 to 90° C. and 0 psig (at ambient atmospheric pressure) for about 2 to 72 hours.

In the above embodiments, the time required for curing of a composite material object is determined by the ability of water vapor and $CO_2$ gas to diffuse throughout the object. In general, thicker objects take longer to cure than thinner objects. Similarly, objects with high density (and fewer open pore spaces) take longer to cure than objects with low density (and more open pore spaces). The following table provides examples of how the curing times may vary with respect to the smallest thickness (or wall thickness or section thickness) of the three dimensions and the bulk density of an object that is being manufactured.

TABLE 2

Examples of Curing Times and Smallest Thickness

| Composite Material Smallest Thickness (mm) | Composite Material Bulk Density (g/cm³) | Approximate Curing Time (h) |
|---|---|---|
| 10 | 2.4 | 2 |
| 25 | 1.6-2.3 | 8-12 |
| 75 | 2.1-2.3 | 16 |
| 100 | 0.4-0.8 | 8-12 |
| 200 | 1.5 | 72 |
| 200 | 2.4 | 72 |

Discussion of Manufactured Microstructures

Figure 11A:
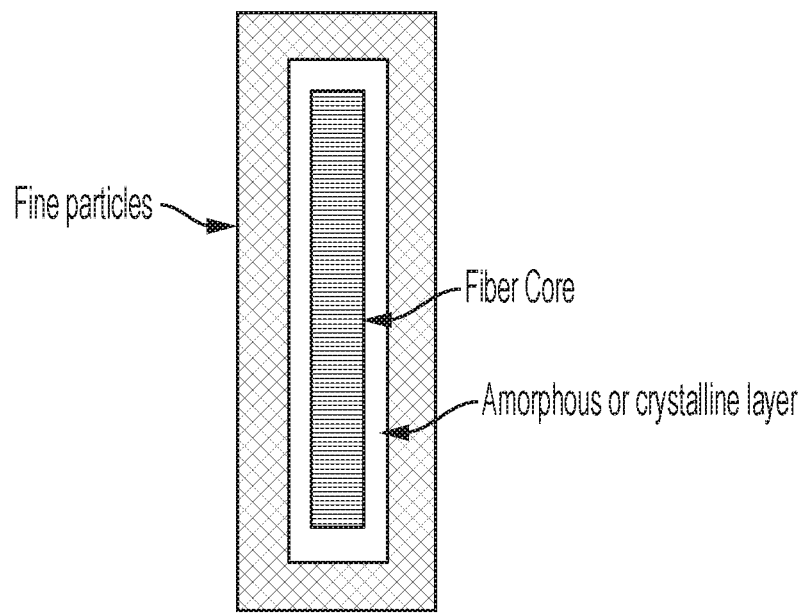
FIGS. 11(a)-11(c) are schematic illustrations of cross-sections of bonding elements according to exemplary embodiments of the present invention, including three exemplary core morphologies: (a) fibrous, (b) elliptical, and (c) equiaxed.
Figure 11B:
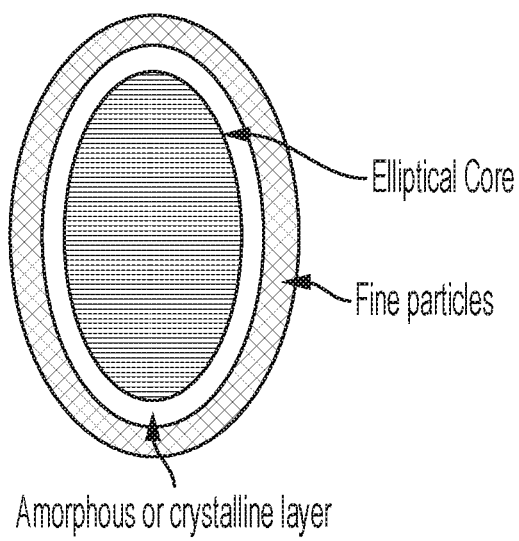
Figure 11C:
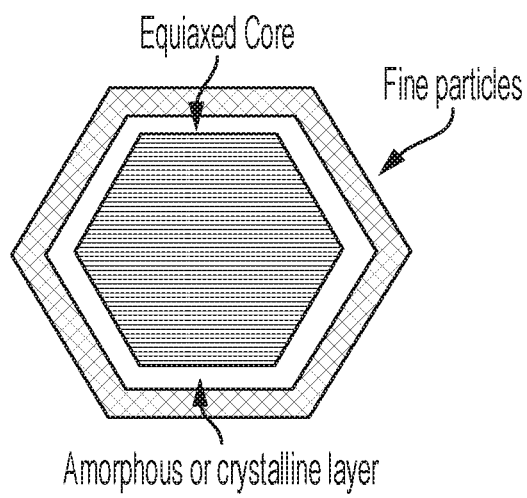

As schematically illustrated in FIGS. 11(a)-11(c), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Figure 12A:
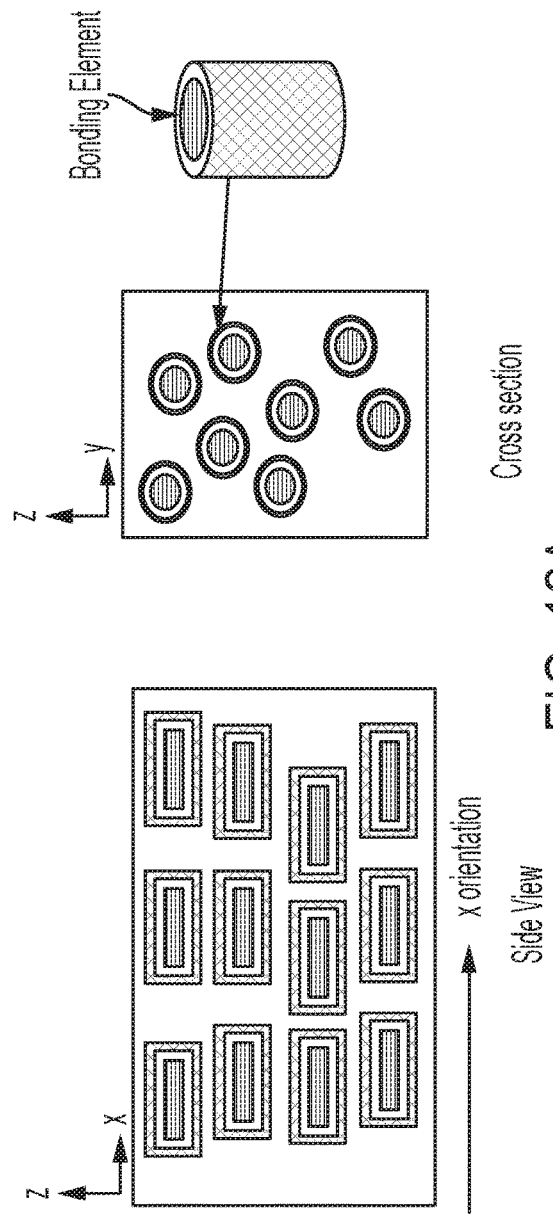
FIGS. 12(a)-12(f) are schematic illustrations of side view and cross section views of composite materials according to exemplary embodiments of the present invention, illustrating (a) 1D oriented fiber-shaped bonding elements in a dilute bonding matrix (bonding elements are not touching), (b) 2D oriented platelet shaped bonding elements in a dilute bonding matrix (bonding elements are not touching), (c) 3D oriented platelet shaped bonding elements in a dilute bonding matrix (bonding elements are not touching), and (d) randomly oriented platelet shaped bonding elements in a dilute bonding matrix (bonding elements are not touching), wherein the composite materials includes the bonding matrix and filler components such as polymers, metals, inorganic particles, aggregates etc., (e) a concentrated bonding matrix (with a volume fraction sufficient to establish a percolation network) of bonding elements where the matrix is 3D oriented, and (f) a concentrated bonding matrix (with a volume fraction sufficient to establish a percolation network) of randomly oriented bonding elements, wherein filler components such as polymers, metals, inorganic particles, aggregates etc. may be included.
Figure 12B:
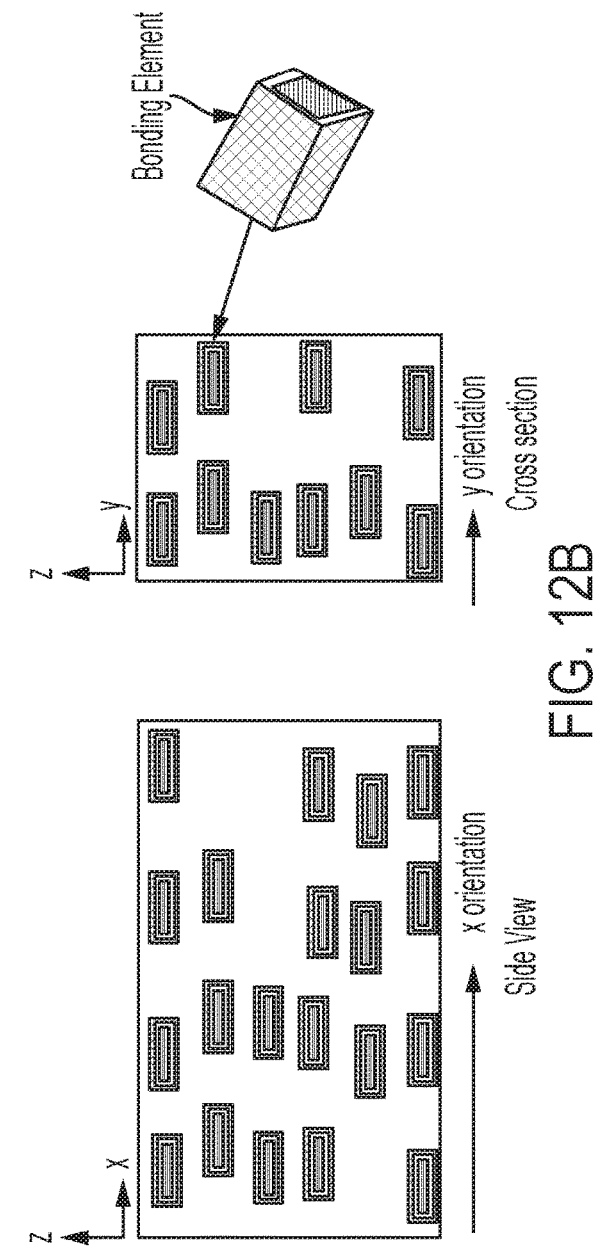
Figure 12C:
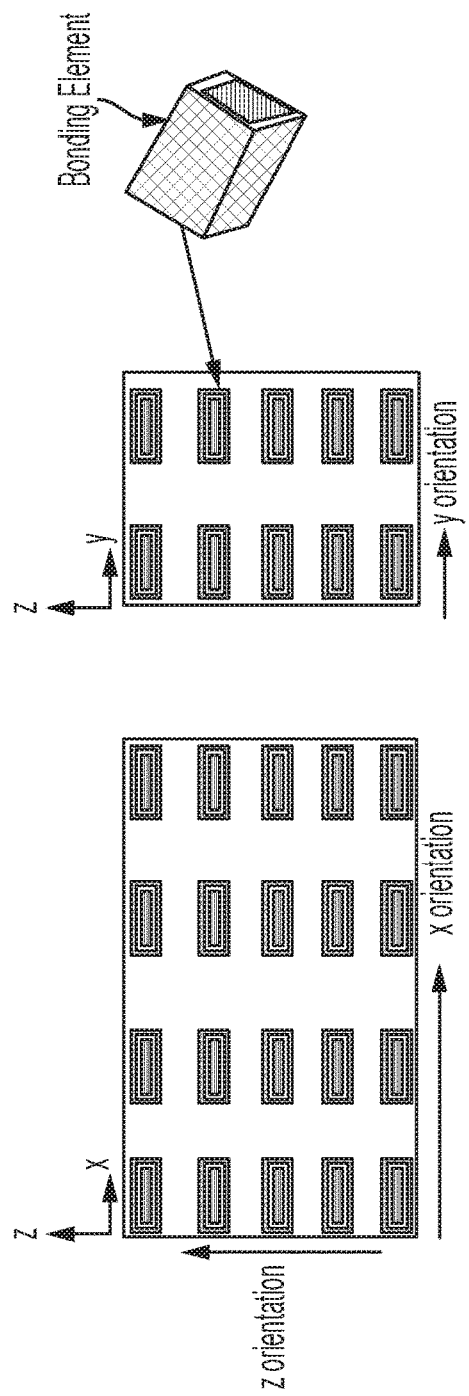
Figure 12D:
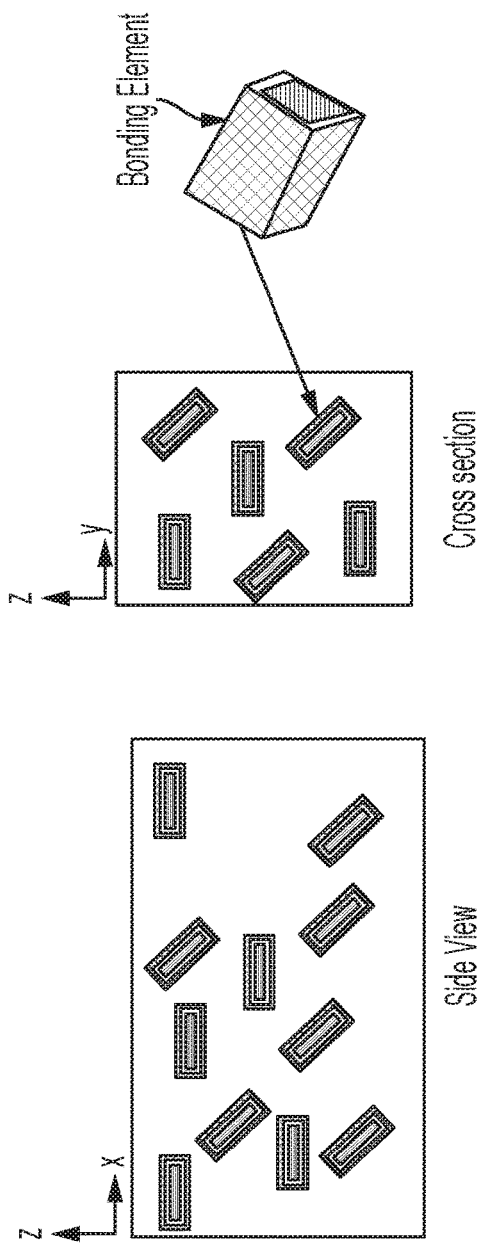
Figure 12E:
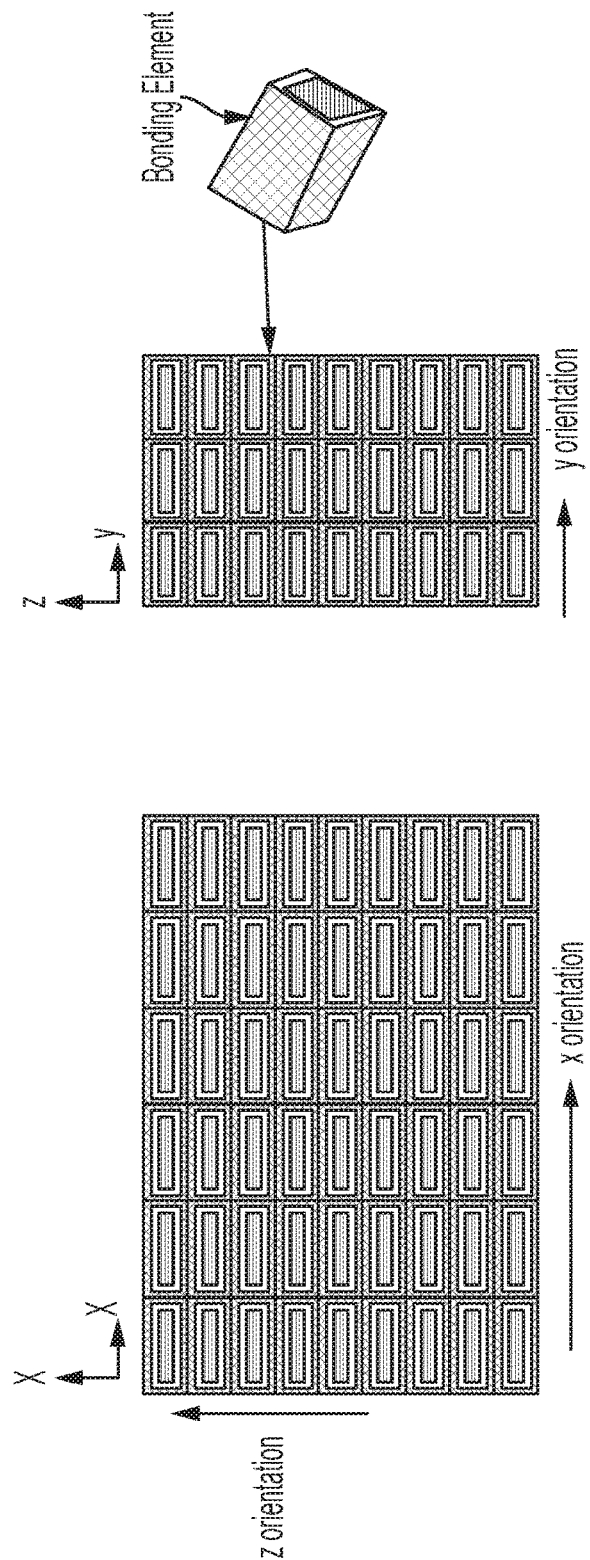
Figure 12F:
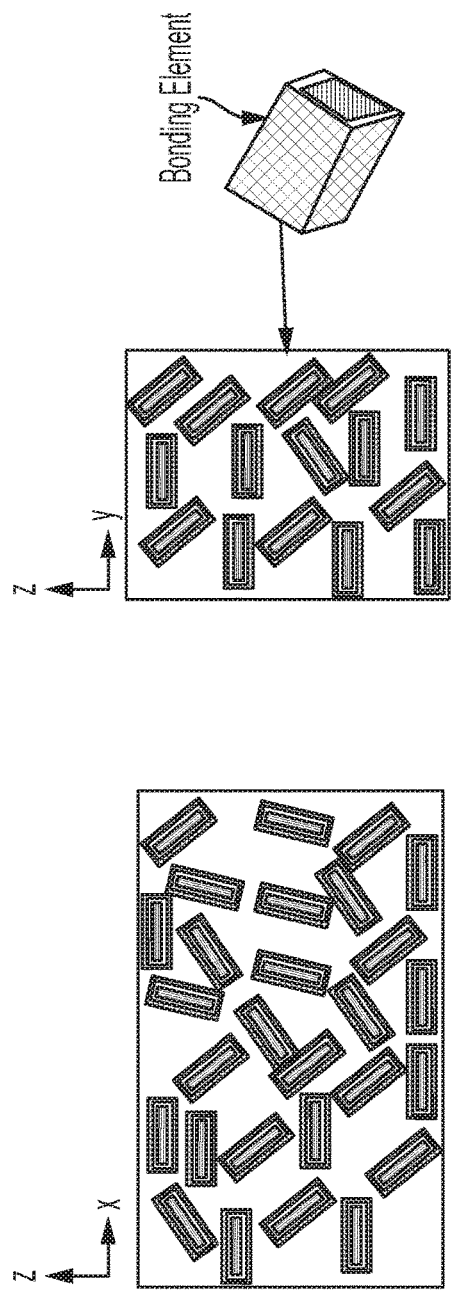

Within the bonding matrix, the bonding elements may be positioned, relative to each other, in any one of a number of orientations. FIGS. 12(a)-12(f) schematically illustrate an exemplary bonding matrix that includes fiber- or platelet-shaped bonding elements in different orientations possibly diluted by the incorporation of filler material, as represented by the spacing between the bonding elements. FIG. 12(a), for example, illustrates a bonding matrix that includes fiber-shaped bonding elements aligned in a one-direction ("1-D") orientation (e.g., aligned with respect to the x direction). FIG. 12(b) illustrates a bonding matrix that includes platelet-shaped bonding elements aligned in a two-direction ("2-D") orientation (e.g., aligned with respect to the x and y directions). FIG. 12(c) illustrates a bonding matrix that includes platelet-shaped bonding elements aligned in a three-direction ("3-D") orientation (e.g., aligned with respect to the x, y and z directions). FIG. 12(d) illustrates a bonding matrix that includes platelet-shaped bonding elements in a random orientation, wherein the bonding elements are not aligned with respect to any particular direction. FIG. 12(e) illustrates a bonding matrix that includes a relatively high concentration of platelet-shaped bonding elements that are aligned in a 3-D orientation. FIG. 12(f) illustrates a bonding matrix that includes a relatively low concentration of platelet-shaped bonding elements that are situated in a random orientation (a percolation network). The composite material of FIG. 12(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 12(e), or random orientation, e.g., FIG. 12(f), of bonding elements. Examples of connectivity patterns can be found in, for example, Newnham, et al., "Connectivity and piezoelectric-pyroelectric composites", *Mat. Res. Bull. vol.* 13, pp. 525-536, 1978).

The plurality of bonding elements may be chemically transformed from any suitable precursor materials, for example, from any suitable calcium silicate composition precursor. The precursor calcium silicate composition may also include one or more chemical elements of aluminum, magnesium and iron.

The plurality of bonding elements may have any suitable median particle size and size distribution dependent on the desired composite material. In certain embodiments, the plurality of bonding elements have a median particle size in the range of about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm).

In some instances a composite material includes: a plurality of bonding elements and a plurality of filler particles. Each bonding element includes: a core comprising primarily calcium silicate, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more textures, patterns and physical properties. In some instances, the bonding elements may have a core of magnesium silicate, and a silica-rich first or inner layer, and a magnesium carbonate-rich second or outer layer. The magnesium silicate can include aluminum, calcium, iron or manganese oxides.

The plurality of filler particles may have any suitable median particle size and size distribution. In certain embodiments, the plurality of filler particles has a median particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

In certain preferred embodiments, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

The weight ratio of (bonding elements:filler particles) may be any suitable ratios dependent on the desired composite material, for example, in the range of about (10 to 50):about (50 to 90).

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

EXAMPLES

Example 1. Aerated Composite Material Made Using Synthetic Wollastonite

Raw Materials

Synthetic Wollastonite (SC-C2), Donghai Golden Resources Industries, Donghai, China; Calcium Oxide, Austin, Tex. (Capitol Brand); Aluminum Paste, Eckrat America Corporation, New Jersey; Glenium 7500, BASF, New Jersey, Filler Materials and Gluconate, Multiple sources.

TABLE 3

| Mixture Proportions (13.56 kg batch size) | | |
| --- | --- | --- |
| Solid Components: | 70.64% | 9.356 kg |
| Synthetic Wollastonite (SC-C2) | 63.62% | 8.630 kg |
| Lime (Calcium Oxide) | 5.17% | 0.702 kg |
| Gluconate | 0.03% | 0.005 kg |
| Aluminum paste | 0.14% | 0.028 kg |
| Liquid Components: | 29.36% | 4.210 kg |
| Tap Water | 29.23% | 4.310 kg |
| Glenium 7500 | 0.123% | 0.016 kg |

Mixing Procedure

1. Measure and load all of the liquid component into a laboratory scale mixer.

2. Add 0.016 kg of viscosity-modifying admixture (Glenium 7500) in the water and stir gently.

3. Measure and load 8.630 kg of the first solid component, which is Synthetic Wollastonite (SC-C2) into the wet mixture.

4. Measure and load 0.702 kg of the second solid component, which is lime (Calcium Oxide) into the mixer and mix the two components at approximately 40 RPM for a duration of five minutes or more until a uniform slurry is formed.

5. Measure and load the remaining 0.005 kg of gluconate into the slurry and continue mixing at the same rate for approximately two minutes.

6. Measure and load 0.028 kg of Aluminum paste (final solid component) into the slurry and continue mixing at a lower rpm rate (30 RPM) for about thirty seconds followed by another thirty seconds of mixing at a higher rpm rate (50 RPM). This creates a wet mixture.

Casting Procedure

1. Lubricate the inner surfaces of each mold(s) using WD-40 or grease to lower the friction between the wet mixture and inner surfaces of the molds as well as to avoid the possibility of the wet mixture sticking to the mold surfaces during de-molding.

2. Pour the wet mixture from the mixer into mold(s) to approximately half the height of the mold. In most cases, no external vibration is required; however, if the mold size is small, then a slight shake or disturbance is required to level the mix.

3. Transfer the mold with the wet mixture to a pre-curing chamber for reaction.

Curing Procedure

1. The sample is reacted in the pre-curing chamber, which is set at 60° C. and 0.3 psi of $CO_2$ gas for 3 hours.

2. After 3 hours of curing, the sample is taken out of the pre-curing chamber, de-molded and placed inside a 7 ft diameter, 12 ft long, horizontal, curing chamber. The curing chamber was purged with $CO_2$ gas for 12 minutes. The temperature of the curing chamber was then set to 60° C. and hot water at 70° C. was circulated at the bottom of the curing chamber to keep the chamber saturated with water vapor. The specimen inside the curing chamber was then cured or reacted under these conditions for 20 hours leading to a creation of a hardened or cured ceramic body.

3. The cured specimen was then removed from the curing chamber. The specimen was then placed in a drying oven and set at 90° C. to remove any residual water. The extent of the reaction was calculated based on the weight gain during the reaction. For the samples prepared using the mixture proportions mentioned in Table 3, the extent of reaction was approximately 40% to approximately 60% assuming a complete reaction of aluminum with the binder and lime.

Figure 13:
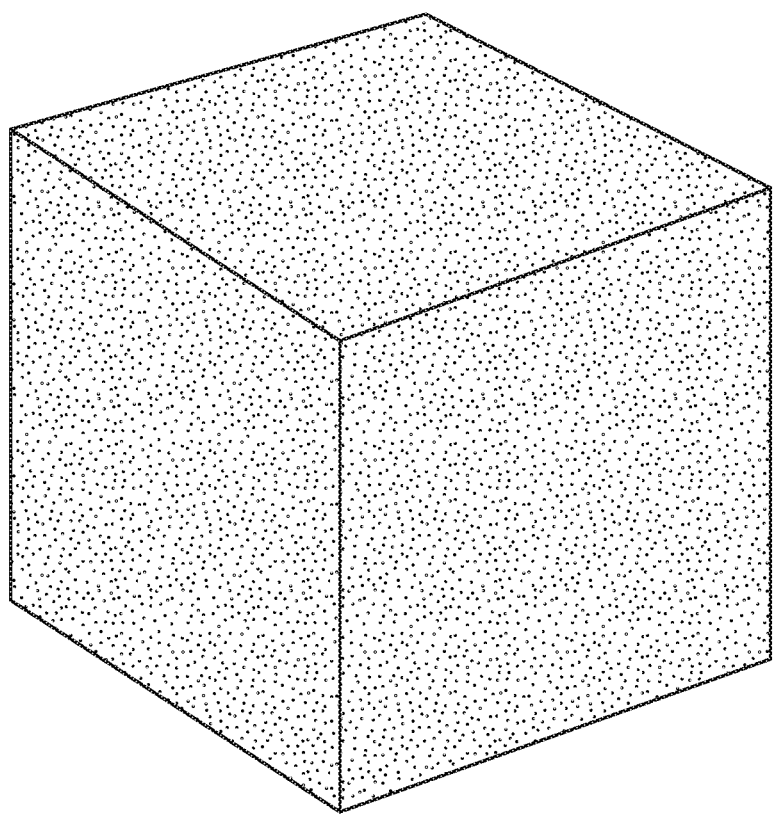
FIG. 13 shows an example of a cut aerated concrete sample (4 inches×4 inches×4 inches for demonstration purpose) made using synthetic wollastonite.

Photograph: FIG. 13 shows an example of a cut aerated concrete sample (4 inches×4 inches×4 inches for demonstration purpose) made using synthetic wollastonite.

Performance Characteristics:

From the preliminary trials and formulation studies, aerated concretes have been produced using the raw materials and processes mentioned previously having a minimum density of about 525 to 725 $kg/m^3$ for a corresponding compressive strength of up to 4 MPa. Also, compressive strengths of up to 5.0 MPa have been demonstrated for a density of approximately 850 $kg/m^3$. Although these densities and compressive strengths are typical for aerated concretes, the grouping of these materials based on a particular strength class is restricted. The reaction conditions can be further optimized to achieve improved mechanical and performance characteristics.

The dimensions of the samples used to carry out several trials for the assessment of material performance are 2-inch and 4-inch cubes, along with 4-in by 4-in by 14-in prismatic specimens.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

The invention claimed is:

1. A process for producing an article of an aerated composite material, comprising:
    forming a wet mixture, wherein the wet mixture comprises:
        water,
        a ground calcium silicate, comprising one or more of synthetic wollastonite, pseudo-wollastonite, rankinite, gehlenite, belite, and alite, having a specific particle size, $d_{10}$ in the range from about 0.25 μm to about 5 μm, $d_{50}$ in the range from about 5 μm to about 20 μm, and $d_{90}$ in the range of about 25 μm to about 100 μm,
        filler particles comprising calcium oxide or silica having a particle size ($d_{50}$) in the range from about 0.25 μm to about 200 μm, and
        an aerating agent,
    casting the wet mixture in a mold;
    providing conditions for generation of a gaseous product from the aerating agent thereby causing volume expansion of the wet mixture;
    pre-curing the expanded mixture at a temperature in the range from about 20° C. to about 100° C. under an atmosphere of water and $CO_2$ for a time sufficient to result in a pre-cured object;
    de-molding and/or cutting the pre-cured object to desired dimensions; and
    further curing the de-molded and/or cut pre-cured object at a temperature in the range from about 20° C. to about 100° C. for about 6 hour to about 60 hours under an atmosphere of water vapor and $CO_2$.

2. The process of claim 1, wherein the wet mixture further comprises: a set-controlling agent; a bubble stabilizing agent, an activating-agent, and a dispersing/viscosity-modifying agent.

3. The process of claim 2, wherein forming a wet mixture comprises mixing the following ingredients in the specified order of addition:
    adding a the calculated portion of water;
    adding and mixing the set-controlling agent;
    adding and mixing the dispersing/viscosity-modifying agent;
    adding and mixing ground calcium silicate;
    adding and mixing the filler particles to form a uniform slurry; and
    adding and mixing the aerating agent.

4. The process of claim 2, wherein the wet mixture comprises mixing the following ingredients in the specified percentages:
    the ground calcium silicate in about 40 wt % to about 95 wt % of the wet mixture;
    the filler particles in about 0 wt % to about 30 wt % of the wet mixture;
    the set-controlling admixture in about 0 wt % to about 0.05 wt % of the wet mixture;
    the dispersing/viscosity-modifying agent in about 0.05 wt % to about 0.25 wt % of the wet mixture; and
    the aerating agent in about 0.05 wt % to about 0.30 wt % of the wet mixture.

5. The process of claim 2, wherein the wet mixture further comprises an additive selected from dispersing, rheology modifying admixtures, pigments, retarders, and accelerators.

6. The process of claim 2, wherein the set-controlling agent is selected from a gluconate and sucrose.

7. The process of claim 2, wherein the dispersing/viscosity-modifying agent is a polycarboxilate based material.

8. The process of claim 2, wherein the ground calcium silicate comprises ground wollastonite, pseudo-wollastonite, rankanite, belite, and elite; the filler particles comprises ground limestone and silica; the activating-agent comprises ground lime; the set-controlling agent is a gluconate; the viscosity-modifying agent comprises a polycarboxilate based material; and the aerating agent comprises aluminum paste.

9. The process of claim 2, wherein at the end of the curing step strength imparting components consist primarily of calcium carbonate and amorphous calcium-silicate phases, calcium-silicate hydrate gel and calcium hydroxide.

10. The process of claim 1, further comprising after curing the pre-cured object, drying the pre-cured object to remove residual water at a temperature in the range from about 20° C. to about 110° C. for about 12 hours to about 96 hours.

11. The process of claim 1, wherein curing the expanded mixture is performed under a pressure ranging from ambient atmospheric pressure to about 30 psi above ambient and under a $CO_2$ concentration ranging from about 25% to about 99.5% to produce an aerated composite material.

12. The process of claim 1, wherein the pre-curing and further curing is carried out under a dynamic $CO_2$ circulating flow condition.

13. The process of claim 1, wherein the pre-curing step is performed at a temperature in the range from about 20° C. to about 80° C. for about 1 hour to about 10 hours under a vapor comprising water and $CO_2$.

14. The process of claim 13, wherein the pre-curing step is performed at a temperature of about 60° C. for about 1 hour to about 5 hours under a vapor comprising water and $CO_2$.

15. The process of claim 1, wherein further curing the pre-cured object is performed at a temperature in the range from about 20° C. to about 80° C. for about 5 hours to about 40 hours under a vapor comprising water and $CO_2$ and having a pressure in the range from about ambient atmospheric pressure to about 30 psi above ambient atmospheric pressure.

16. The process of claim 15, wherein further curing the pre-cured object is performed at a temperature in the range from about 30° C. to about 70° C. for about 10 hours to about 30 hours under a vapor comprising water and $CO_2$ and having a pressure in the range from about ambient atmospheric pressure to about 60 psi above ambient atmospheric pressure.

17. The process of claim 1, wherein the ground calcium silicate is selected from wollastonite, pseudo-wollastonite, rankanite, belite, and alite.

18. The process of claim 1, wherein the filler particles are selected from fly ash, bottom ash, slag having particle sizes ranging from about 0.5 μm to about 300 μm.

19. The process of claim 1, wherein the filler particles are selected from limestone, miro-silica, and quartz having particle sizes ranging from about 1 μm to about 500 μm.

20. The process of claim 1, wherein the filler particles are selected from aggregates having particle sizes ranging from about 20 μm to about 500 μm.

21. The process of claim 1, wherein the aerating agent is selected from aluminum, iron, zinc, in powder and or paste form.

22. The process of claim 1, wherein the aerating agent is hydrogen peroxide in liquid form.

\* \* \* \* \*